US012445256B2

(12) United States Patent
Huang et al.

(10) Patent No.: US 12,445,256 B2
(45) Date of Patent: *Oct. 14, 2025

(54) CONTROLLING MULTIPLEXING OF A REFERENCE SIGNAL ON AN UPLINK SHARED CHANNEL

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Renqiu Wang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,590

(22) Filed: Jul. 19, 2022

(65) Prior Publication Data

US 2023/0006801 A1    Jan. 5, 2023

Related U.S. Application Data

(63) Continuation of application No. 16/243,858, filed on Jan. 9, 2019, now Pat. No. 11,394,517.

(Continued)

(51) Int. Cl.
*H04L 5/00* (2006.01)
*H04L 5/26* (2006.01)
(Continued)

(52) U.S. Cl.
CPC .......... *H04L 5/0057* (2013.01); *H04L 5/0007* (2013.01); *H04L 5/0042* (2013.01);
(Continued)

(58) Field of Classification Search
CPC ... H04L 5/0057; H04L 5/0007; H04L 5/0042; H04L 5/0051; H04L 5/0055;
(Continued)

(56) References Cited

U.S. PATENT DOCUMENTS

| 11,394,517 B2 | 7/2022 | Huang et al. |
| 2014/0286255 A1 | 9/2014 | Nam et al. |

(Continued)

FOREIGN PATENT DOCUMENTS

| CN | 104521169 A | 4/2015 |
| CN | 104871619 A | 8/2015 |
| WO | WO-2017019132 A1 | 2/2017 |

OTHER PUBLICATIONS

LG Electronics: "Design of Long NR-PUCCH Format", R1-1702481, 3GPP TSG RAN WG1 Meeting #88, Athens, Greece Feb. 13-17, 2017, 5 Pages.

(Continued)

*Primary Examiner* — Mang Hang Yeung
(74) *Attorney, Agent, or Firm* — Holland & Hart LLP

(57) ABSTRACT

Methods, systems, and devices for wireless communications are described for controlling multiplexing of a reference signal on an uplink shared channel (UL-SCH). In an implementation, a user equipment (UE) may time division multiplex (TDM) a demodulation reference signal (DMRS) with other signaling across symbol periods of one or more allocated resource blocks. The UE may map the DMRS to resource elements of one or more symbol periods within the allocated resource blocks. The UE may then map uplink control information (UCI) to one or more symbol periods different than the symbol periods of the DMRS mapping. In some cases, the DMRS, UCI, or both may be frequency interleaved with UL-SCH data for the allocated resource blocks. The UE may generate and transmit an uplink wave- (Continued)

form for transmission within the allocated resources of the uplink shared channel.

18 Claims, 24 Drawing Sheets

Related U.S. Application Data

(60) Provisional application No. 62/617,127, filed on Jan. 12, 2018.

(51) Int. Cl.
*H04W 72/1263* (2023.01)
*H04W 72/1268* (2023.01)
*H04W 72/23* (2023.01)
*H04W 72/20* (2023.01)

(52) U.S. Cl.
CPC .......... *H04L 5/0051* (2013.01); *H04L 5/0055* (2013.01); *H04L 5/0094* (2013.01); *H04L 5/26* (2013.01); *H04W 72/1263* (2013.01); *H04W 72/1268* (2013.01); *H04W 72/23* (2023.01); *H04W 72/20* (2023.01)

(58) Field of Classification Search
CPC .... H04L 5/0094; H04L 5/26; H04W 72/1263; H04W 72/1268; H04W 72/23; H04W 72/20
USPC .......................................................... 370/330
See application file for complete search history.

(56) References Cited

U.S. PATENT DOCUMENTS

| | | | |
|---|---|---|---|
| 2015/0156764 A1* | 6/2015 | Yang | H04L 1/1671 370/329 |
| 2015/0181589 A1 | 6/2015 | Luo et al. | |
| 2015/0282158 A1 | 10/2015 | Chen et al. | |
| 2016/0211960 A1* | 7/2016 | Wang | H04L 25/0224 |
| 2018/0138965 A1 | 5/2018 | Martin | |
| 2018/0167932 A1* | 6/2018 | Papasakellariou | H04L 1/1671 |
| 2018/0192416 A1* | 7/2018 | Yin | H04L 5/0053 |
| 2019/0373644 A1 | 12/2019 | Wang et al. | |
| 2020/0178222 A1* | 6/2020 | Wang | H04L 5/0044 |
| 2020/0244499 A1* | 7/2020 | Yoshioka | H04W 72/21 |
| 2020/0259612 A1* | 8/2020 | Nakamura | H04L 5/0053 |

OTHER PUBLICATIONS

LG Electronics: "Discussion on UL Channel Multiplexing in NR," 3GPP Draft, R1-1702484, 3GPP TSG RAN WG1 Meeting #88, Discussion On UL Channel Multiplexing in NR, 3rd Generation Partnership Project (3GPP), Mobile Competence Centre, 650, Route Des Lucioles, F-06921 Sophia-Antipolis Cedex, Fra, vol. RAN WGl, No, Athens, Greece, Feb. 13, 2017-Feb. 17, 2017, Feb. 12, 2017 (Feb. 12, 2017), XP051209638, 6 Pages.
International Search Report and Written Opinion—PCT/US2019/013028—ISA/EPO—Apr. 25, 2019 (181448WO).
Samsung: "UL Control Channel Design", 3GPP TSG RAN WG1 #87, 3GPP Draft, R1-1612529 UL Control Channel, 3rd Generation Partnership Project (3GPP), Mobile Competence Centre; 650, Route Des Lucioles; F-06921 Sophia-Antipolis Cedex; France, vol. RAN WG1. No. Reno, USA; Nov. 14, 2016-Nov. 18, 2016, Nov. 13, 2016 (Nov. 13, 2016), XP051176476, pp. 1-4.
ZTE: "UCI Multiplexing on PUSCH", 3GPP TSG RAN WG1 Meeting #90, R1-1712455, Prague, Czechia Aug. 21-25, 2017, 5 Pages.

* cited by examiner

CONTROLLING MULTIPLEXING OF A REFERENCE SIGNAL ON AN UPLINK SHARED CHANNEL

CROSS REFERENCES

The present application for patent is a Continuation of U.S. patent application Ser. No. 16/243,858 by HUANG et al., entitled, "CONTROLLING MULTIPLEXING OF A REFERENCE SIGNAL ON AN UPLINK SHARED CHANNEL" filed Jan. 9, 2019, which claims the benefit of U.S. Provisional Patent Application No. 62/617,127 by HUANG, et al., entitled "CONTROLLING FREQUENCY DIVISION MULTIPLEXING OF A REFERENCE SIGNAL ON AN UPLINK SHARED CHANNEL," filed Jan. 12, 2018, assigned to the assignee hereof, and expressly incorporated herein.

BACKGROUND

The following relates to wireless communication, and more specifically to controlling multiplexing of a reference signal on an uplink shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support options for controlling multiplexing of a reference signal on an uplink shared channel (UL-SCH). In some cases, the UE may time division multiplex (TDM) a demodulation reference signal (DMRS) with other signaling, such as uplink control information (UCI) or UL-SCH data, in different symbol periods. The UE may map the DMRS to resource elements of one or more symbol periods within one or more resource blocks allocated to the UE for an uplink transmission (e.g., as part of an uplink grant). The UE may then map UCI to one or more symbol periods different than the symbol periods of the DMRS mapping. In some cases, the DMRS, UCI, or both may be frequency interleaved with UL-SCH data for the resource blocks. In other cases, a base station may generate a message indicating whether a UE is to frequency division multiplex (FDM) a DMRS within a symbol period of a resource block allocated to the UE for an uplink transmission. The message may include a single bit or an index that jointly signals a set of parameters, and may be control information transmitted to the UE via a control channel (e.g., downlink control information (DCI) in a physical downlink control channel (PDCCH)) or via radio resource control (RRC) signaling.

The UE may determine the multiplexing operation based on a type of waveform to be used for the uplink transmission. The type of waveform used for the uplink transmission may include a discrete Fourier transport spread orthogonal frequency division multiples (DFT-S-OFDM) waveform or a cyclic prefix orthogonal frequency division multiplex (CP-OFDM) waveform. Based on the message and the waveform type, the UE may TDM or FDM DMRS with UCI and/or UL-SCH data within the resource block allocated for uplink transmission. The UE may therefore efficiently utilize PUSCH resources and transmit a waveform of the uplink transmission having desired properties.

A method of wireless communication is described. The method may include receiving, by a UE, a grant allocating a resource block of an uplink shared channel for an uplink transmission, determining, by the UE, a mapping for the resource block that includes time division multiplexing a demodulation reference signal and uplink control information to different symbol periods of the resource block, and transmitting an uplink waveform within the resource block based on the mapping.

An apparatus for wireless communication is described. The apparatus may include a processor, memory in electronic communication with the processor, and instructions stored in the memory. The instructions may be executable by the processor to cause the apparatus to receive, by a UE, a grant allocating a resource block of an uplink shared channel for an uplink transmission, determine, by the UE, a mapping for the resource block that includes time division multiplexing a demodulation reference signal and uplink control information to different symbol periods of the resource block, and transmit an uplink waveform within the resource block based on the mapping.

Another apparatus for wireless communication is described. The apparatus may include means for receiving, by a UE, a grant allocating a resource block of an uplink shared channel for an uplink transmission, determining, by the UE, a mapping for the resource block that includes time division multiplexing a demodulation reference signal and uplink control information to different symbol periods of the resource block, and transmitting an uplink waveform within the resource block based on the mapping.

A non-transitory computer-readable medium storing code for wireless communication is described. The code may include instructions executable by a processor to receive, by a UE, a grant allocating a resource block of an uplink shared channel for an uplink transmission, determine, by the UE, a mapping for the resource block that includes time division multiplexing a demodulation reference signal and uplink control information to different symbol periods of the resource block, and transmit an uplink waveform within the resource block based on the mapping.

In some examples of the method, apparatuses, and non-transitory computer-readable medium described herein, determining the mapping for the resource block may include operations, features, means, or instructions for determining the mapping for the resource block that maps the demodulation reference signal to resource elements of a first symbol period of the resource block and maps the uplink control information to resource elements of a second symbol period of the resource block, the second symbol period distinct from the first symbol period.

In some examples of the method, apparatuses, and non-transitory computer-readable medium described herein, the resource elements of the first symbol period may be separated by one or more intervening resource elements.

In some examples of the method, apparatuses, and non-transitory computer-readable medium described herein, the one or more intervening resource elements may be empty.

In some examples of the method, apparatuses, and non-transitory computer-readable medium described herein, the one or more intervening resource elements include uplink data.

In some examples of the method, apparatuses, and non-transitory computer-readable medium described herein, determining the mapping for the resource block may include operations, features, means, or instructions for determining the mapping for the resource block that frequency division multiplexes the demodulation reference signal and uplink data in at least one symbol period of the resource block.

In some examples of the method, apparatuses, and non-transitory computer-readable medium described herein, determining the mapping for the resource block may include operations, features, means, or instructions for determining the mapping for the resource block that does not frequency division multiplex the demodulation reference signal and uplink data within any symbol period of the resource block.

Some examples of the method, apparatuses, and non-transitory computer-readable medium described herein may include operations, features, means, or instructions for generating the uplink waveform in accordance with a waveform indicator of the grant that indicates a type of the uplink waveform.

In some examples of the method, apparatuses, and non-transitory computer-readable medium described herein, the type of the uplink waveform specifies a discrete Fourier transport spread orthogonal frequency division multiplex (DFT-S-OFDM) waveform or a cyclic prefix orthogonal frequency division multiplex (CP-OFDM) waveform.

Some examples of the method, apparatuses, and non-transitory computer-readable medium described herein may include operations, features, means, or instructions for receiving, from the base station, radio resource control signaling including a waveform indicator that indicates a type of the uplink waveform.

In some examples of the method, apparatuses, and non-transitory computer-readable medium described herein, the uplink control information includes a hybrid automatic repeat request acknowledgement indication.

In some examples of the method, apparatuses, and non-transitory computer-readable medium described herein, the uplink control information includes control state information part 1 data that includes at least one of a rank indicator, a channel state information reference signal index, or a channel quality indicator.

In some examples of the method, apparatuses, and non-transitory computer-readable medium described herein, the uplink control information includes control state information part 2 data that includes at least one of a precoding matrix indicator, or a channel quality indicator.

A method of wireless communication is described. The method may include receiving, by a user equipment (UE), a message indicating whether the UE is to frequency division multiplex a demodulation reference signal within a symbol period of a resource block of an uplink shared channel, generating, by the UE, an uplink waveform based on the message, and transmitting, by the UE, the uplink waveform within the resource block of the uplink shared channel.

An apparatus for wireless communication is described. The apparatus may include means for receiving, by a user equipment (UE), a message indicating whether the UE is to frequency division multiplex a demodulation reference signal within a symbol period of a resource block of an uplink shared channel, means for generating, by the UE, an uplink waveform based on the message, and means for transmitting, by the UE, the uplink waveform within the resource block of the uplink shared channel.

Another apparatus for wireless communication is described. The apparatus may include a processor, memory in electronic communication with the processor, and instructions stored in the memory. The instructions may be operable to cause the processor to receive, by a user equipment (UE), a message indicating whether the UE is to frequency division multiplex a demodulation reference signal within a symbol period of a resource block of an uplink shared channel, generate, by the UE, an uplink waveform based on the message, and transmit, by the UE, the uplink waveform within the resource block of the uplink shared channel.

A non-transitory computer-readable medium for wireless communication is described. The non-transitory computer-readable medium may include instructions operable to cause a processor to receive, by a user equipment (UE), a message indicating whether the UE is to frequency division multiplex a demodulation reference signal within a symbol period of a resource block of an uplink shared channel, generate, by the UE, an uplink waveform based on the message, and transmit, by the UE, the uplink waveform within the resource block of the uplink shared channel.

Some examples of the method, apparatus, and non-transitory computer-readable medium described above may include processes, features, means, or instructions for processing the message to determine that the demodulation reference signal may be to be frequency division multiplexed with uplink control information or uplink data within the symbol period of the resource block.

Some examples of the method, apparatus, and non-transitory computer-readable medium described above may include processes, features, means, or instructions for processing the message to determine that the demodulation reference signal may be not to be frequency division multiplexed with uplink control information or uplink data within the symbol period of the resource block.

Some examples of the method, apparatus, and non-transitory computer-readable medium described above may include processes, features, means, or instructions for processing the message to determine that the demodulation reference signal may be to be time division multiplexed with the uplink control information or the uplink data within the resource block.

In some examples of the method, apparatus, and non-transitory computer-readable medium described above, receiving the message includes processing a control channel corresponding to the resource block to obtain downlink control information (DCI) that comprises the message.

In some examples of the method, apparatus, and non-transitory computer-readable medium described above, the message may be a single bit included in the DCI.

In some examples of the method, apparatus, and non-transitory computer-readable medium described above, the message indicates an index to a table that indicates a set of parameters for the resource block.

In some examples of the method, apparatus, and non-transitory computer-readable medium described above, the index jointly signals the set of parameters to the UE.

In some examples of the method, apparatus, and non-transitory computer-readable medium described above, generating the waveform includes generating the uplink waveform in accordance with a waveform indicator that indicates a type of the uplink waveform.

In some examples of the method, apparatus, and non-transitory computer-readable medium described above, the type specifies a discrete Fourier transport spread orthogonal frequency division multiplex (DFT-S-OFDM) waveform or a cyclic prefix orthogonal frequency division multiplex (CP-OFDM) waveform.

In some examples of the method, apparatus, and non-transitory computer-readable medium described above, generating the uplink waveform includes generating uplink control information (UCI). In some examples of the method, apparatus, and non-transitory computer-readable medium described above, generating the uplink waveform includes determining a mapping that maps the UCI to at least resource element of the resource block. In some examples of the method, apparatus, and non-transitory computer-readable medium described above, generating the uplink waveform includes generating the uplink waveform based on the UCI and the mapping.

In some examples of the method, apparatus, and non-transitory computer-readable medium described above, the UCI comprises at least one of channel state information (CSI) data, or CSI part 1 data, or CSI part 2 data, or acknowledgement data.

In some examples of the method, apparatus, and non-transitory computer-readable medium described above, generating the uplink waveform includes generating uplink data. In some examples of the method, apparatus, and non-transitory computer-readable medium described above, generating the uplink waveform includes determining a second mapping that maps the uplink data to at least resource element of the resource block. In some examples of the method, apparatus, and non-transitory computer-readable medium described above, generating the uplink waveform includes generating the uplink waveform based on the uplink data and the second mapping.

A method of wireless communication is described. The method may include generating, by a base station, a message indicating whether a user equipment (UE) is to frequency division multiplex a demodulation reference signal within a symbol period of a resource block of an uplink shared channel, transmitting the message to the UE, and monitoring, by the base station, the resource block of the uplink shared channel for an uplink waveform that is generated based on the message.

An apparatus for wireless communication is described. The apparatus may include means for generating, by a base station, a message indicating whether a user equipment (UE) is to frequency division multiplex a demodulation reference signal within a symbol period of a resource block of an uplink shared channel, means for transmitting the message to the UE, and means for monitoring, by the base station, the resource block of the uplink shared channel for an uplink waveform that is generated based on the message.

Another apparatus for wireless communication is described. The apparatus may include a processor, memory in electronic communication with the processor, and instructions stored in the memory. The instructions may be operable to cause the processor to generate, by a base station, a message indicating whether a user equipment (UE) is to frequency division multiplex a demodulation reference signal within a symbol period of a resource block of an uplink shared channel, transmit the message to the UE, and monitor, by the base station, the resource block of the uplink shared channel for an uplink waveform that is generated based on the message.

A non-transitory computer-readable medium for wireless communication is described. The non-transitory computer-readable medium may include instructions operable to cause a processor to generate, by a base station, a message indicating whether a user equipment (UE) is to frequency division multiplex a demodulation reference signal within a symbol period of a resource block of an uplink shared channel, transmit the message to the UE, and monitor, by the base station, the resource block of the uplink shared channel for an uplink waveform that is generated based on the message.

In some examples of the method, apparatus, and non-transitory computer-readable medium described above, monitoring the resource block includes decoding a first subset of a plurality of resource elements within the symbol period of the resource block in accordance with the message to obtain the demodulation reference signal. In some examples of the method, apparatus, and non-transitory computer-readable medium described above, monitoring the resource block includes skipping decoding a second subset of the plurality of resource elements within the symbol period of the resource block.

In some examples of the method, apparatus, and non-transitory computer-readable medium described above, monitoring the resource block includes decoding a first subset of a plurality of resource elements within the symbol period of the resource block in accordance with the message to obtain the demodulation reference signal. In some examples of the method, apparatus, and non-transitory computer-readable medium described above monitoring the resource block includes decoding a second subset of the plurality of resource elements within the symbol period of the resource block to obtain uplink control information or uplink data.

Some examples of the method, apparatus, and non-transitory computer-readable medium described above may include processes, features, means, or instructions for setting the message to indicate that the demodulation reference signal may be to be frequency division multiplexed with uplink control information or uplink data within the symbol period of the resource block.

Some examples of the method, apparatus, and non-transitory computer-readable medium described above may include processes, features, means, or instructions for setting the message to indicate that the demodulation reference signal may be not to be frequency division multiplexed with uplink control information or uplink data within the symbol period of the resource block.

Some examples of the method, apparatus, and non-transitory computer-readable medium described above may include processes, features, means, or instructions for setting the message to indicate that the demodulation reference signal may be to be time division multiplexed with the uplink control information or the uplink data within the resource block.

In some examples of the method, apparatus, and non-transitory computer-readable medium described above, transmitting the message to the UE includes generating downlink control information (DCI) that comprises the message. In some examples of the method, apparatus, and non-transitory computer-readable medium described above, transmitting the message to the UE includes transmitting the DCI in a control channel corresponding to the resource block.

In some examples of the method, apparatus, and non-transitory computer-readable medium described above, the message may be a single bit included in the DCI.

In some examples of the method, apparatus, and non-transitory computer-readable medium described above, the message indicates an index to a table that indicates a set of parameters for the resource block.

In some examples of the method, apparatus, and non-transitory computer-readable medium described above, the index jointly signals the set of parameters to the UE.

Some examples of the method, apparatus, and non-transitory computer-readable medium described above may include processes, features, means, or instructions for transmitting a waveform indicator to the UE for indicating a type of the uplink waveform.

In some examples of the method, apparatus, and non-transitory computer-readable medium described above, the type specifies a discrete Fourier transport spread orthogonal frequency division multiplex (DFT-S-OFDM) waveform or a cyclic prefix orthogonal frequency division multiplex (CP-OFDM) waveform.

Some examples of the method, apparatus, and non-transitory computer-readable medium described above may include processes, features, means, or instructions for decoding the resource block to obtain uplink control information (UCI).

In some examples of the method, apparatus, and non-transitory computer-readable medium described above, the UCI comprises at least one of channel state information (CSI) data, or CSI part 1 data, or CSI part 2 data, or acknowledgement data.

Some examples of the method, apparatus, and non-transitory computer-readable medium described above may include processes, features, means, or instructions for decoding the resource block to obtain uplink data.

DETAILED DESCRIPTION

Figure 1:
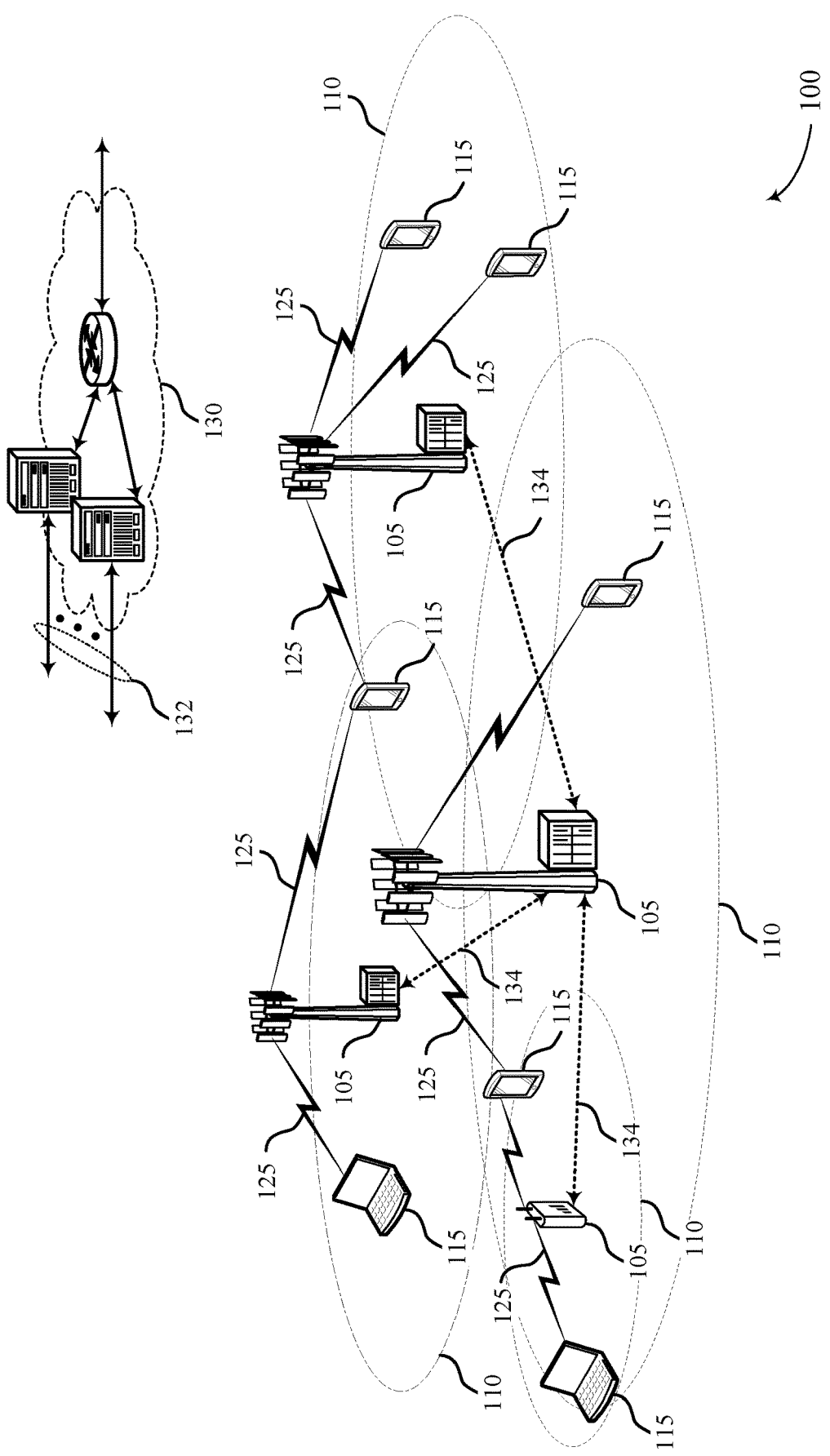
FIG. 1 illustrates an example of a system for wireless communication that supports controlling multiplexing of a reference signal on an uplink shared channel in accordance with aspects of the present disclosure.

The described techniques relate to improved methods, systems, devices, or apparatuses that support options for controlling multiplexing of a reference signal on an uplink shared channel (UL-SCH), such as a physical uplink shared channel (PUSCH). In an example, a user equipment (UE) may determine a mapping for allocating signaling to time and frequency resources of an uplink shared channel (e.g., a PUSCH). The time and frequency resources may correspond to one or more resource blocks included in a grant for uplink transmission, and each resource block may include a set of tones (subcarriers) and OFDM symbol periods.

In some cases, the UE may time division multiplex (TDM) a demodulation reference signal (DMRS) with other signaling, such as uplink control information (UCI) or UL-SCH data, in different symbol periods. The UE may map the DMRS to resource elements of one or more symbol periods within the resource block. The UE may then map UCI to one or more symbol periods different than the symbol periods of the DMRS mapping. In some cases, the DMRS, UCI, or both may be frequency interleaved with UL-SCH data for the resource block.

In other cases, a base station may transmit downlink signaling, including the grant, to the UE for an uplink transmission (e.g., for a PUSCH transmission). The base station may also generate a message indicating whether the UE is to frequency divisional multiplex (FDM) a DMRS within a symbol period of the allocated resource block. The message may be a single bit or an index that jointly signals a set of parameters, and may be control information transmitted to the UE over a control channel (e.g., downlink control information (DCI) in a physical downlink control channel (PDCCH)) or via radio resource control (RRC) signaling.

A UE may receive and process the message to determine a multiplexing operation of the DMRS, including whether to FDM the DMRS with other signaling in a same symbol period, or instead to TDM the DMRS with the other signaling in a different symbol periods. In some examples, the other signaling may be UL-SCH data and/or UCI. In some cases, UCI may only be time division multiplexed with DMRS, regardless of waveform type used for the uplink transmission. For example, for UCI that is piggybacked on PUSCH that includes UL-SCH data, the UCI may only be time division multiplexed (and not frequency division multiplexed) with DMRS, regardless of waveform. One benefit of this technique is that the UE may apply a unified mapping pattern for mapping UCI to resource elements of a PUSCH transmission that is independent of the type of waveform used to generate the PUSCH transmission.

In some cases, the type of multiplexing may be waveform dependent. For example, if PUSCH is based on a discrete Fourier transform-spread-OFDM (DFT-S-OFDM) waveform, UCI and/or UL-SCH data may only be time division multiplexed with DMRS, and may not be frequency division multiplexed with UCI. If PUSCH is based on a cyclic prefix orthogonal frequency division multiplex (CP-OFDM) waveform, UCI and/or UL-SCH data may or may not be frequency division multiplexed, and the base station may use DCI and/or RRC signaling for controlling whether to FDM DMRS with UCI and/or UL-SCH data.

In some examples, the UE may determine the multiplexing operation based on a type of waveform to be used for the uplink transmission. Based on the message and the waveform type, the UE may TDM or FDM DMRS with UCI and/or UL-SCH data within a resource block allocated to the UE for an uplink transmission.

In some cases, the UE may FDM DMRS with UCI and/or UL-SCH data by alternating tones in a particular symbol period to transport DMRS and one of UCI or UL-SCH data. In other cases, the UE may alternate tones that transport DMRS with empty tones in a particular symbol period.

The controlling of whether to FDM DMRS may provide efficient PUSCH resource allocation based on a waveform type used for the uplink transmission. In an example, the UE may TDM DMRS with UCI and/or UL-SCI data to enable the UE to generate a waveform having single-carrier waveform properties, such as a DFT-S-OFDM waveform. In other examples, the UE may FDM DMRS with UCI and/or UL-SCI data and generate a cyclic prefix (CP)-OFDM waveform that more efficiently utilizes resources of the PUSCH as compared to a DFT-S-OFDM waveform. The UE may therefore efficiently utilize PUSCH resources and transmit a waveform of the uplink transmission having desired properties.

Aspects of the disclosure are initially described in the context of a wireless communications system. The wireless communications system may piggyback UCI and UL-SCH data on resources of an uplink shared channel, and transmit in combination with DMRS over the uplink shared channel. Aspects of the disclosure are illustrated by and described with reference to apparatus diagrams, system diagrams, and flowcharts that relate to multiplexing DMRS on a uplink shared channel when piggybacking UCI on PUSCH.

FIG. 1 illustrates an example of a wireless communications system 100 that supports controlling multiplexing of a reference signal on an uplink shared channel in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, including in the range of 300 MHz to 300 GHz. The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Additionally, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a sub-optimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power). In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may contain one or multiple symbol periods. In some cases, the TTI duration (that is, the number of symbol periods in a TTI) may be variable.

Single-Carrier Frequency Division Multiple Access (SC-FDMA), like Orthogonal Frequency Division Multiplexing (OFDM), divides transmission bandwidth into multiple parallel subcarriers. Parallel subcarriers may allow each respective subcarrier to be individually modulated while maintaining a lower symbol rate for transmission, therefore improving robustness. In some cases, frequency-selective channels may insert a guard period (e.g., a cyclic prefix (CP)) into the timing at the beginning of each data symbol, as a means to sustain orthogonality between the maintained subcarriers. Implementation of a CP within the transmission may be referred to as CP-OFDM, and aid in improving resilience to multipath delays and spread causal to inter-symbol interference.

In LTE/LTE-Advanced (LTE-A) systems, UEs may provide uplink signaling to a base station using single-carrier waveforms such as DFT-S-OFDM, or spectral efficient waveforms such as CP-OFDM that may be well localized in the time domain. The selected uplink signaling waveform configuration may be in contrast to multicarrier transmission schemes (e.g., orthogonal frequency division multiple access (OFDMA)) implemented for downlink. This is because a UE's power amplifier may not be sufficient for the large power variations coincident with OFDMA transmissions. By transmitting using DFT-S-OFDM, CP-OFDM, or the like, the UE 115 may mitigate variation to signal power at the transmitter of the UE 115, and may reduce distortion to the output waveform (i.e., distortion to the time-domain waveform may distort the frequency-domain power spectrum).

A UE 115 may transmit uplink shared channel (UL-SCH) data and signaling from the medium access control (MAC) layer on physical uplink shared channel (PUSCH) resources. In new radio (NR) systems, PUSCH may support two waveforms: CP-OFDM or DFT-S-OFDM. UCI may be carried on the physical uplink control channel (PUCCH) resources designated for control signaling, or multiplexed with data on the PUSCH. Transmitting control information, such as CSI, in an uplink shared channel (e.g., within a PUSCH) may be referred to herein as piggybacking. UCI is control signaling that may include any combination of (1) hybrid automatic repeat request (HARQ) ACKnowledgement/Negative ACKnowledgement (ACK/NAK) information for one or more component carriers, (2) periodic channel state information (CSI) aperiodic CSI feedback for one or more component carriers, (3) a scheduling request (SR), (4) a buffer status report (BSR), or the like.

In conventional systems, UCI is transmitted via PUCCH resources, and data is sent signaling over PUSCH resources. However, in the case of limited or no present UL-SCH data for uplink transmission, PUSCH resources of the uplink grant may be empty or underutilized. As a result, resources within the uplink channel may be sub-optimally allocated. Techniques of the present disclosure include efficiently allocating available time and frequency resources of an uplink grant for UCI transmission.

A base station 105 may generate a message indicating whether a UE 115 is to FDM DMRS within a symbol period of a resource block allocated to the UE 115 for an uplink transmission by an uplink grant. The message may be provided via DCI signaling, and may include a single bit indication or an index that jointly signals a set of parameters to the UE 115. The base station 105 may transmit the message over PDCCH, for subsequent reception at the UE 115. The UE 115 may receive and process the message, and determine a multiplexing operation for resource allocation. The resource allocation may include multiplexing DMRS relative to UCI on allocated resources of PUSCH and, in some cases, UL-SCH data. The UE 115 may then generate an uplink waveform in accordance with the multiplexing operation and transmit the waveform over PUSCH. The described examples herein describe methods for piggybacking UCI on allocated PUSCH resources. The multiplexing operations may utilize configured waveform properties and improve resource allocation efficiency.

Figure 2:
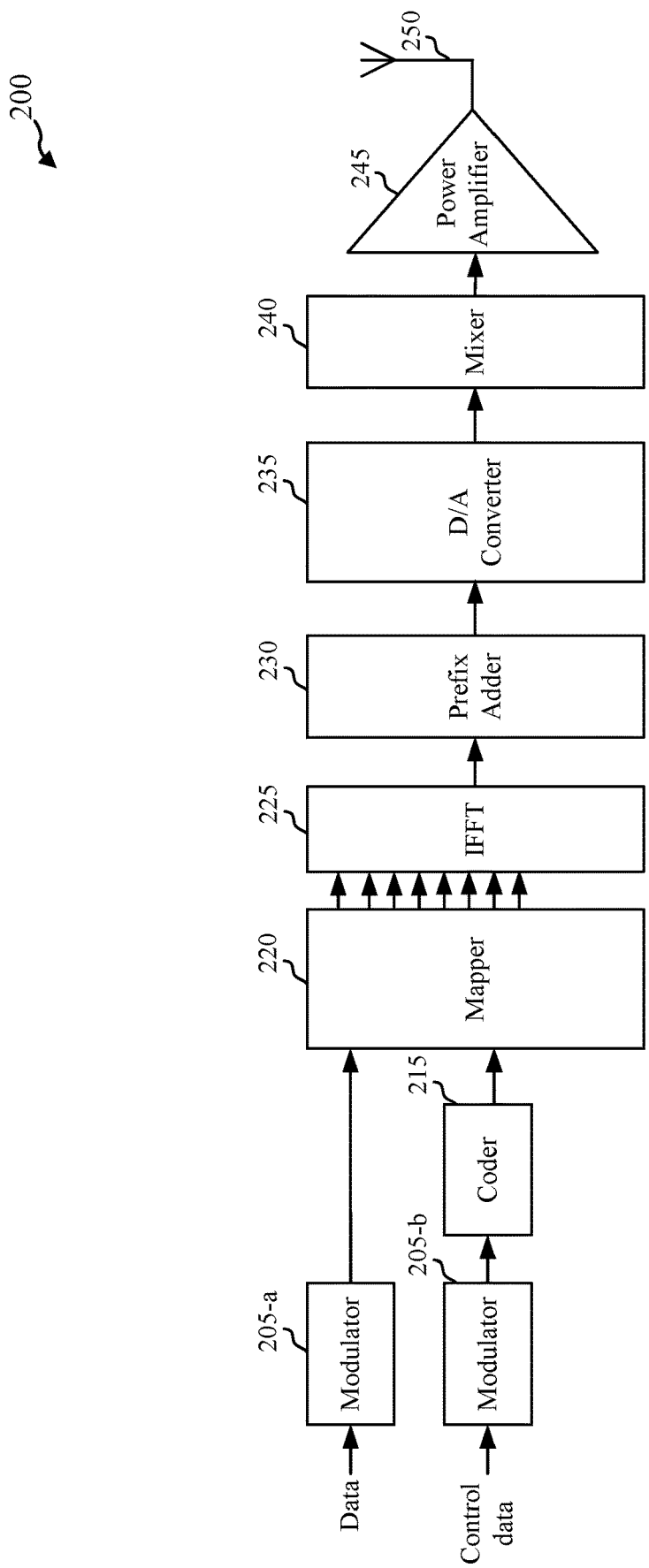
FIG. 2 illustrates an example transmitter for controlling multiplexing of a reference signal on an uplink shared in accordance with aspects of the present disclosure.

FIG. 2 illustrates an example of a transmitter 200 of a UE 115 that supports controlling multiplexing of a reference signal on an uplink shared channel, in accordance with one or more aspects of the present disclosure. Transmitter 200 may be used for data channel-referenced UCI resource allocation. Transmitter 200 may generate a waveform for an uplink transmission based at least in part on resources of a data channel (e.g., PUSCH) allocated by a grant received from the base station 105. It is noted transmitter 200 is one example of a transmitter that may be used by a UE 115, and other transmitters may apply the principles described herein.

A UE 115 may receive a resource grant from base station 105. The grant may indicate time and frequency resources allocated for an uplink transmission that may span a set of OFDM symbols and a bandwidth that spans a set of subcarriers. In an example, the grant may identify a set of one or more resource blocks for an uplink transmission, and each of the resource blocks may include a set of resource elements. Each resource element may correspond to a single subcarrier (e.g., a tone) and a single OFDM symbol. The grant may indicate one or more resource blocks and corresponding subcarriers, for control channel (e.g., PUCCH) and/or data channel (e.g., PUSCH) signaling. Transmitter 200 may identify UCI for piggybacking on resources of the data channel (e.g., PUSCH). Additionally, the UE 115 may identify a UL-SCH data associated with the MAC layer for transmission over allocated resources of the data channel.

A modulator 205-b may modulate each of the uplink control data bits (e.g., UCI bits) into control data symbols using a modulation technique such as, for example, PSK, QPSK, 16QAM, and the like. Similarly, a modulator 205-a may modulate each of the uplink data (e.g., UL-SCH data) bits into control data symbols. Modulator 205-b may output the respective control data symbols to a coder 215 for subsequent baseband processing and coding. Coder 215 may be a frequency spreader that produces spread control data symbols that are a frequency domain representation of the input symbols for generation of a single-carrier waveform (e.g., discrete Fourier transform (DFT)-spread-OFDM (DFT-S-OFDM)).

In the case of DFT-S-OFDM waveform generation of the control data symbols, the frequency spreader may be a DFT-spreading block or sequence multiplier block for the respective coded bits potentially signaled using DFT-S-OFDM transmission schemes. The DFT spreading block may perform a DFT operation. The sequence multiplier block may multiply the input symbols by a sequence having some frequency characteristics sufficient to generate spread of the input symbols. In some cases, the sequence may be a cell-specific base sequence that is a function of a physical layer identity (PCI).

The coder 215 may apply a series of time domain cyclic shifts to the cell-specific based sequence to randomize intercell interference. In some examples, the UE 115 may determine whether to use the DFT-spreading block or the sequence multiplier block based at least in part on the number of control data symbols, with the DFT-spreading block being used when the number satisfies a threshold (e.g., exceeds a defined number of symbols). The data symbols and the spread control symbols may then be fed into a mapper 220 for mapping.

Mapper 220 may map the data symbols and the control data symbols onto available resource elements of the allocated PUSCH and/or PUCCH resources. In determining where to map the data symbols, the mapper may process the uplink resource allocation received via downlink signaling from a base station 105, indicating which resource blocks within the resource grid are allocated to the UE 115 for the PUSCH resource. Mapper 220 may FDM or TDM DMRS with UCI and/or UL-SCH data based on the message received from the base station about whether the UE 115 is to FDM DMRS. Examples of frequency division multiplexing are described herein, and with reference to FIGS. 4-6.

Each allocated resource block of the PUSCH resource may include demodulation reference signaling (DMRS) for channel estimation and coherent demodulation of the data channel. The DMRS may be modulated according to the complex-valued Zadoff-Chu sequence and mapped directly onto the subcarriers of the data channel using OFDM. When mapping UCI, for example, the mapper 220 may perform the mapping in accordance with a UCI format.

After mapping of the data symbols and the control symbols to resource elements of an uplink shared channel, an inverse fast Fourier transform (IFFT) component 225 performs an IFFT (or, equivalently, an inverse discrete Fourier Transform (IDFT)) to compute in-phase and quadrature components of a corresponding time-domain waveform. In the case of CP-OFDM, a prefix adder 230 may add a CP to the in-phase and quadrature components. The CP may be a set of samples which are duplicated from the end of each mapped symbol of the allocated resources and appended cyclically to the beginning of each respective symbol. The prefix adder 230 is optional and may be omitted if a CP-OFDM waveform is not being sent.

A digital to analog converter 235 of the UE 115 may convert the output of the prefix adder 230 or of the IFFT 230 to an analog signal and a mixer 240 of the UE 115 may modulate the analog signal to a radio frequency of a carrier. A power amplifier 245 then amplifies the RF analog signal for transmission by the antenna 250 of the UE 115. As a result, the UE 115 may generate a single-carrier waveform (e.g., DFT-S-OFDM) or a spectrally efficient, time localized waveform (e.g., CP-OFDM) for each of the UCI combinations and/or UL-SCH data. The UE 115 may then transmit the waveform using an antenna 250, over resources of the uplink resource allocation.

In some examples, the UE 115 may be configured to support multiple arrangements for modulating and subsequently mapping UCI on PUSCH. The multiple arrangements may include piggybacking of the UCI on available resource elements of the PUSCH resource.

Figure 3:
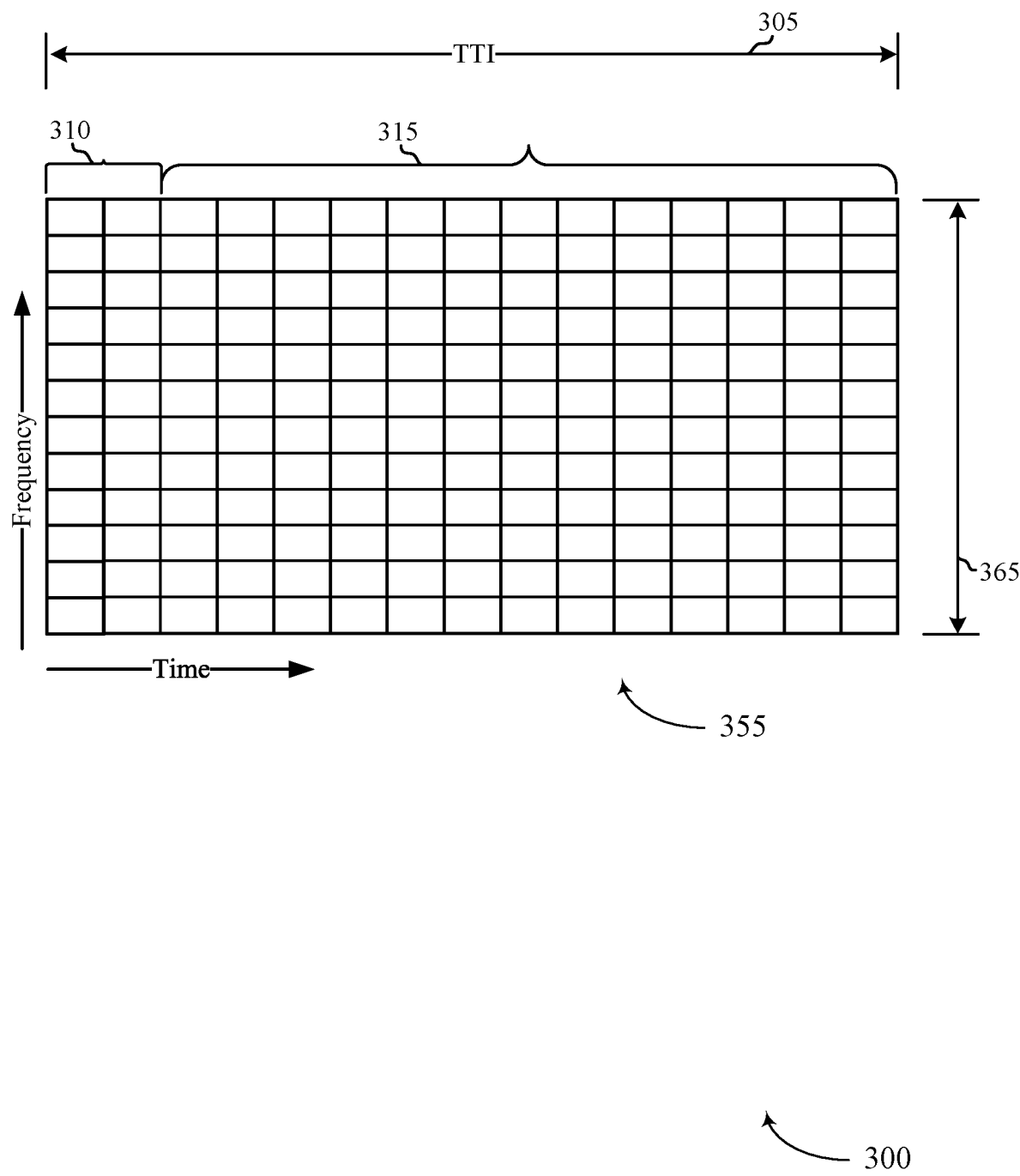
FIG. 3 illustrates an example of a transmission time interval that supports controlling multiplexing of a reference signal on an uplink shared channel in accordance with aspects of the present disclosure.

FIG. 3 illustrates an example diagram 300 of a transmission time interval (TTI) 305 that supports controlling multiplexing of a reference signal on an uplink shared channel, in accordance with one or more aspects of the present disclosure. TTI 305 may correspond to a set of OFDM symbols and a set subcarriers that are a set of time and frequency resources that the base station 105-a may allocate to UE 115-a for an uplink transmission. Frequency is shown from top to bottom, and time is shown from left to right. The bandwidth 365 of TTI 305 may represent a portion of a system bandwidth that the base station 105-a may allocate to one or more UEs 105. TTI 305 may repeat in time and the base station 105-a may allocate each TTI 305 to the same UE or to different UEs. The time and frequency resources of TTI 305 may correspond to a resource block that includes 12 subcarriers and 14 symbol periods. The time and frequency resources of TTI 305 may include other numbers of subcarriers and/or symbol periods.

TTI 305 includes a PUCCH 310 and a PUSCH 355, each corresponding to a different set of resource elements. The grant may allocate one or more RBs to the UE 115 for an uplink transmission. The resource allocation may include multiplexing DMRS with UCI and/or UL-SCH data in the resource elements of PUSCH 355. The multiplexing may include one or more of time division multiplexing (TDM) and frequency division multiplexing (FDM) methods. When piggybacking UCI on PUSCH, the UE 115 may, in some examples, forgo mapping the UCI within the resource elements of the PUCCH 310. In some examples, mapping of information and/or data to resource elements 315 of the PUSCH 355 may be based on a waveform type the UE 115 is to use to generate a PUSCH transmission, as determined by received downlink signaling from the base station 105. The waveform type may be a single-carrier DFT-S-OFDM waveform, a time localized CP-OFDM waveform, or similar waveform configuration as specified in the uplink grant.

The examples described herein may provide for improved techniques for transmitting UCI on resources of an uplink shared channel (e.g., PUSCH). In some instances, the type of multiplexing used may be waveform dependent, and based on the received downlink waveform configuration for the PUSCH resource. Additionally, in some cases (e.g., CP-OFDM waveforms) the UE 115 may FDM DMRS with UCI and/or UL-SCH data within PUSCH resources.

Figure 4A:
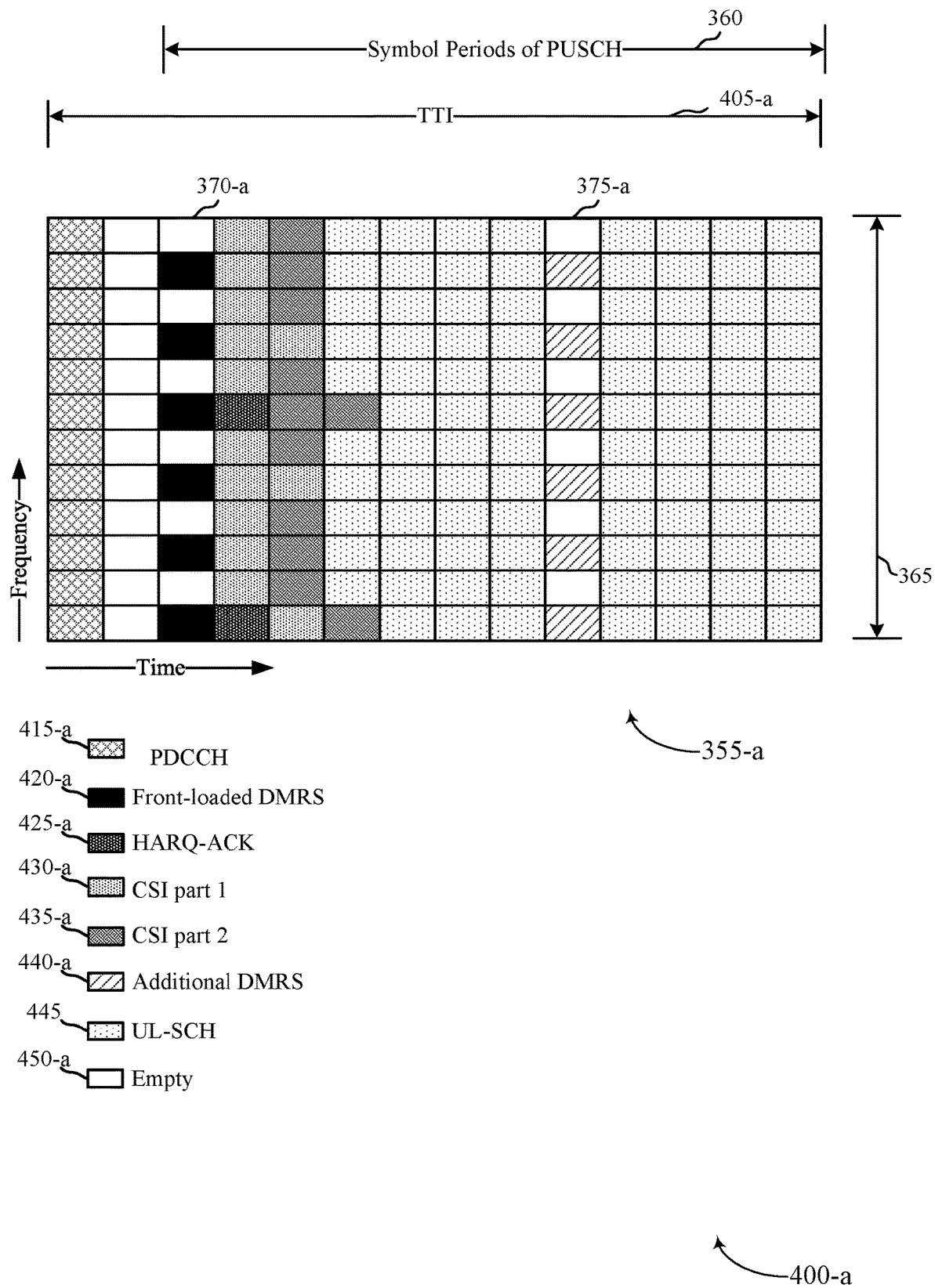
FIGS. 4A and 4B illustrate examples of time and frequency resources that support controlling multiplexing of a reference signal on an uplink shared channel in accordance with aspects of the present disclosure.

In some examples, a UE 115 may receive a message indicating whether to FDM a DMRS within a symbol period of a resource block of an uplink shared channel. FIG. 4A illustrates an example diagram 400-a of time and frequency resources of a TTI 405-a that supports controlling multiplexing of a reference signal on an uplink shared channel, in accordance with one or more aspects of the present disclosure. Frequency is shown from top to bottom, and time is shown from left to right. A first symbol period of TTI 405-a may be a physical downlink control channel (PDCCH) 415-a that transports downlink signaling, such as DCI, from the base station 105-a to the UE 115-a. The downlink signaling may include one or more indications directed to the UE, including a resource grant as part of the uplink resource allocation. In an example, the PDCCH 415-a may include a message indicating whether the UE 115-a is to FDM a DMRS within one or more symbol periods of PUSCH 355. In the depicted example, the message may indicate whether the UE 115-a is to FDM DMRS in the third symbol period 370-a and the tenth symbol period 375-a of TTI 405-a. A second symbol period of TTI 405-a may be a guard period 450-a. Guard period 350 may not transport any information and/or data to aid in obviating interference between downlink and uplink transmissions (e.g., between receiving a PUCCH transmission and sending a PUSCH transmission).

The UE 115-a may modulate and map DMRS signaling to allocated resource elements of the PUSCH 355. The DMRS signaling may facilitate coherent demodulation of data carried over PUSCH 355 and provide channel estimation. The UE may modulate the DMRS according to the complex-valued Zadoff-Chu sequence and map the DMRS payload directly onto the subcarriers of the PUSCH 355 using OFDM. Mapping of the modulated DMRS may include mapping of a front-loaded DMRS 420-a, as well as additional DMRS signaling 440-a. In some cases, the UE 115-a may map DMRS 420-a and/or DMRS 440-a to distinct resource elements within a symbol period, allowing resource frequency gaps (i.e., empty resource elements 450-a) between the distinct resource elements. This may be referred to herein as a comb-like structure for DMRS signaling over PUSCH 355.

In some cases, the UE 115-a may have MAC layer UL-SCH data to transmit in the PUSCH transmission. The UE 115-a may map the UL-SCH data 445 to available subcarrier frequencies within the PUSCH 355. In some examples, the UE 115-a may TDM the UL-SCH data 445 relative to DMRS signaling 420-a and 440-a in different symbol periods of the PUSCH 355. Additional resource elements of the PUSCH 355 may be available to piggyback UCI on PUSCH relative to UL-SCH data 445 and each of DMRS signaling 420-a and 440-a.

The UE 115-a may piggyback the one or more UCI combinations, including at least hybrid automatic repeat request (HARQ) acknowledgement (ACK) indication 425-a and one or more CSI allocations 440-a and 445-a (e.g., CSI part 1 and CSI part 2), to available resource elements of the PUSCH 355. For example, CSI part 1 may include one or more of a rank indicator (RI), CSI reference signal index (CRI), a channel quality indicator (CQI) for a first continuous wave (CW), or the like, or any combination thereof. CSI part 2 may include Precoding Matrix Indicator (PMI), CQI for a second CW, or the like, or any combination thereof. In accordance with the configured single-carrier properties of the PUSCH transmission (i.e., DFT-S-OFDM), the UE may TDM the one or more UCI combinations relative to DMRS signaling 420-a and 440-a, similar to UL-SCH data 445.

For example, to maintain a single-carrier waveform, when PUSCH transmission is to be a DFT-OFDM waveform, the UE 115-a may not FDM DMRS with UCI and/or UL-SCH data, even when the DMRS includes a comb-like structure (see symbol period 370). Instead, the UE 115-a may TDM DMRS with UCI and UL-SCH data. In some cases, UCI may only be time division multiplexed with DMRS, regardless of waveform type used for the uplink transmission.

In FIG. 4A, for example, the resource elements in the third symbol period 370-a of PUSCH 355 only include DMRS 420-a on every other resource element, and the intervening resource elements are empty. Similarly, the resource elements in the tenth symbol period 375-a of PUSCH 355 only include DMRS 440-a on every other resource element, and the intervening resource elements are empty. The DMRS 420-a in third symbol period 370-a and the DMRS 440-a in the tenth symbol period 375-a of TTI 405-a are time division multiplexed with UCI and UL-SCH data that are transported in different symbol periods of PUSCH 355. For example, UCI is depicted in FIG. 4A as CSI part 1 430-a and CSI part 2 435-a that is transported in the fourth through the sixth symbol periods of TTI 405-a, and UL-SCH data 445 is transported in the sixth through the ninth symbol periods and the eleventh through the fourteenth symbol periods of TTI 405-a. Because DMRS 420-a and 440-a are not frequency division multiplexed with other data and/or information in any symbol period of PUSCH 355, destructive interference may be obviated, while allowing for piggybacking UCI on PUSCH.

Figure 4B:
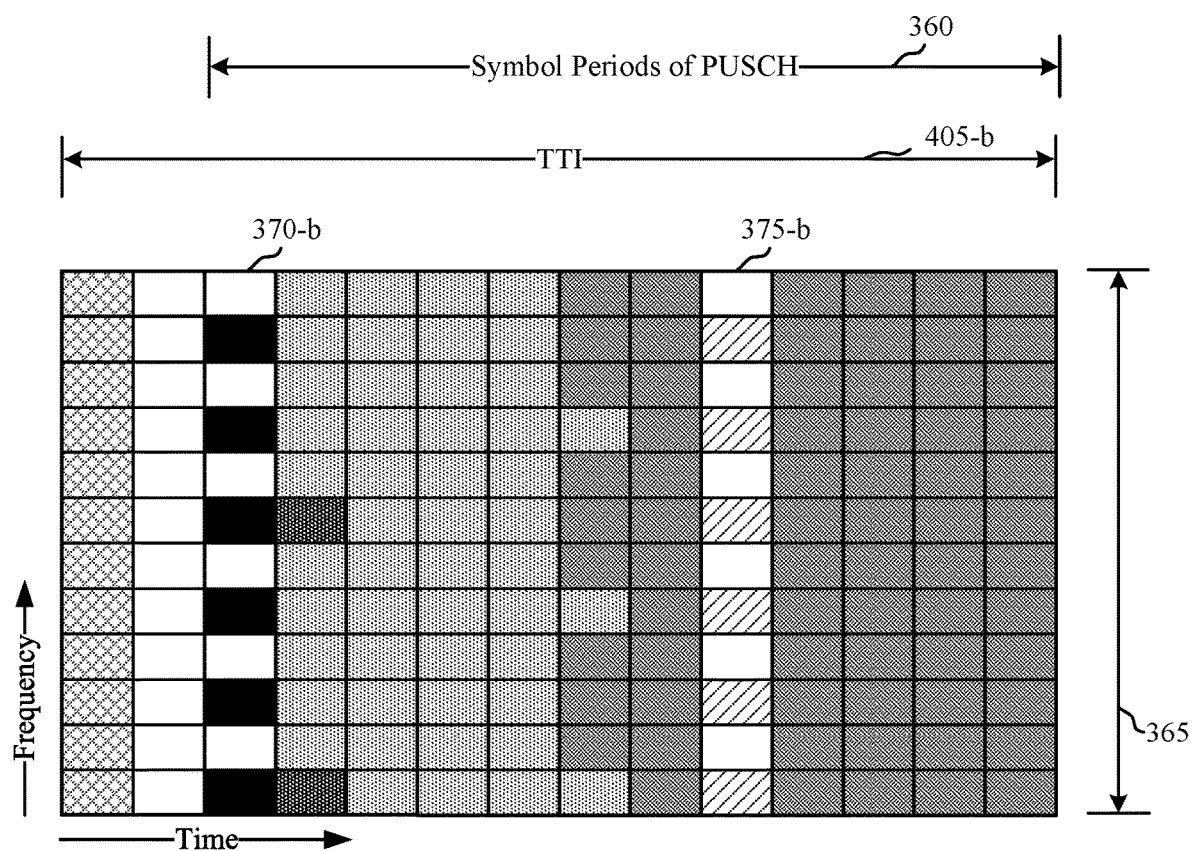

In another example, the techniques described herein may apply even when an uplink transmission does not include UL-SCH data. FIG. 4B illustrates an example diagram 400-b of piggybacking UCI on PUSCH, without UL-SCH data, that supports controlling multiplexing of a reference signal on an uplink shared channel, in accordance with one or more aspects of the present disclosure. TTI 405-b is similar to TTI 405-a of FIG. 4A. In this example, DCI in PDCCH 415 may include a grant allocating resources of the PUSCH 355 to the UE 115-a. The base station 105-a may signal in DCI and/or via RRC signaling that the UE 115-a is to generate a single carrier waveform.

To maintain a single carrier waveform, when a PUSCH transmission is to be a DFT-OFDM waveform, the UE 115-a may not FDM DMRS with UCI and/or UL-SCH data, even when the DMRS includes a comb-like structure (see symbol period 370). Instead, the UE 115-a may TDM DMRS with UCI and UL-SCH data.

In FIG. 4B, for example, the resource elements in the third symbol period 370-b of PUSCH 355 only include DMRS 420-b on every other resource element, and the intervening resource elements are empty. Similarly, the resource elements in the tenth symbol period 375-b of PUSCH 355 only include DMRS 440-b on every other resource element, and the intervening resource elements are empty. The DMRS 420-b in third symbol period 370-b and the DMRS 440-a in the tenth symbol period 375-b of TTI 405-b are time division multiplexed with UCI and UL-SCH data that are transported in different symbol periods of PUSCH 355. For example, UCI is depicted as CSI part 1 430-b and CSI part 2 435-b. CSI part 1 430-b is transported in the fourth through the eighth symbol periods of TTI 405-b, and CSI part 2 435-b is transported in the eleventh through the fourteenth symbol periods of TTI 405-b.

In some examples, a PUSCH transmission may be generated using a CP-OFDM waveform. CP-OFDM may provide increased spectral efficiency and localization in the time domain in comparison to alternative OFDM waveforms (e.g., windowed-OFDM, filtered-OFDM, OFDMA, etc.). Even though a CP-OFDM waveform may not quite qualify as being a single carrier waveform, PUSCH transmission generated using a CP-OFDM waveform beneficially may permit frequency division multiplexing of DMRS with UCI and/or UL-SCH data.

Figure 5A:
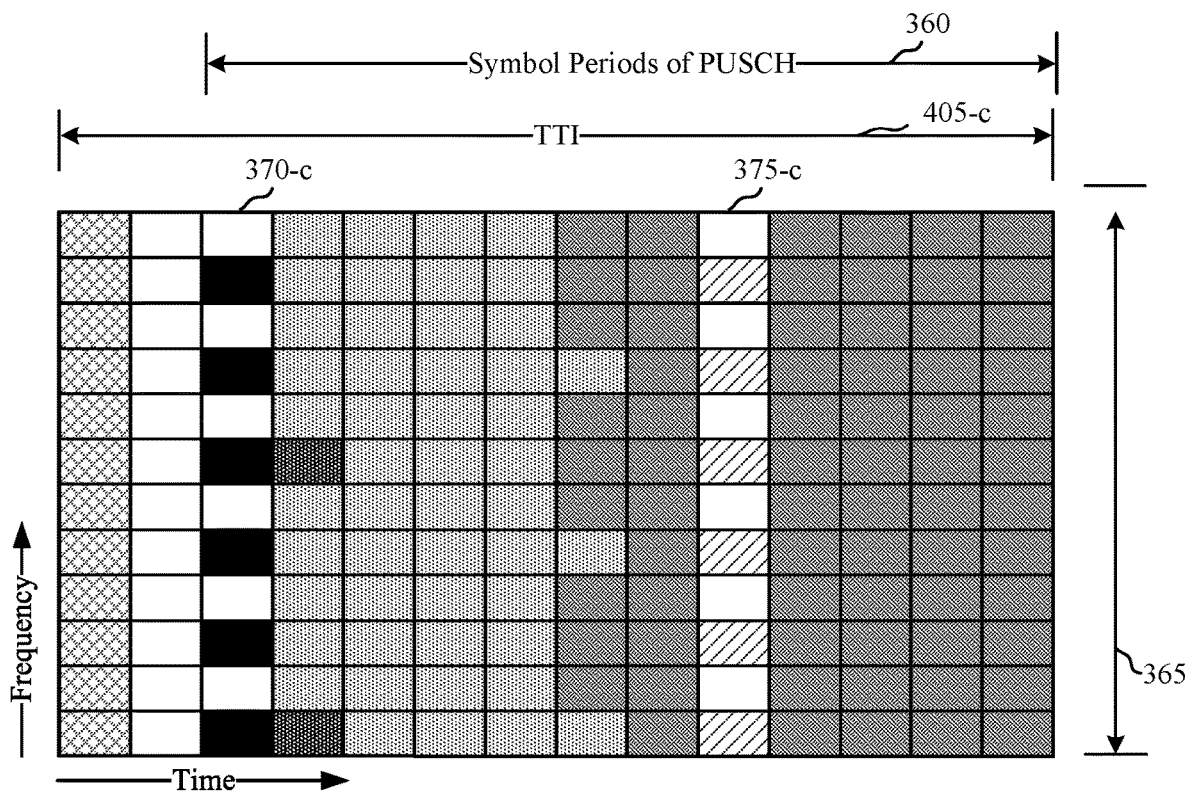
FIGS. 5A and 5B illustrate examples of time and frequency resources that support controlling multiplexing of a reference signal on an uplink shared channel in accordance with aspects of the present disclosure.

In an examples, base station 105-a may signal a waveform indicator that indicates a type of uplink waveform to the UE 115-a in DCI and/or RRC signaling to use for an uplink transmission. FIG. 5A illustrates an example diagram 500-a of piggybacking UCI on PUSCH that supports controlling multiplexing of a reference signal on an uplink shared channel, in accordance with one or more aspects of the present disclosure. TTI 405-c may be an example of TTIs 405-, and 405-b.

In the depicted example, DCI in PDCCH 415-d may include a grant of resources in PUSCH 355 and a message instructing the UE 115-a not to FDM DMRS. In some cases, the message may be a single bit in DCI to indicate whether to FDM DMRS.

In some cases, the message may indicate an index to a table. The index may be a set of one or more bits included in DCI and the value of the one or more bits may be used to index a table stored by the UE 115-a. The index may be used to indicate a set of one or more parameters stored in the table, and the UE 115-a may apply the parameters corresponding to the index when generating an uplink transmission within the resources indicated in the grant. In some examples, the UE 115 may implicitly determine the number of code division multiplexing (CDM) groups without data based on a value of an index included in the message. In an example, the message may include an index for indexing TABLE 1, provided below.

TABLE 1

| Index Value | Number of CDM group(s) without data | DMRS port(s) | Number of front-load symbols |
| --- | --- | --- | --- |
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |
| 8 | 2 | 4 | 2 |
| 9 | 2 | 5 | 2 |
| 10 | 2 | 6 | 2 |
| 11 | 2 | 7 | 2 |
| 12-15 | Reserved | Reserved | Reserved |

As shown in the example of TABLE 1, a value of an index, for example, may be used to jointly signal a set of parameters such as the number of CDM groups without data, a DMRS port(s) identifier, a number of front-loaded DMRS symbols, any combination thereof, or the like.

The message included in PDCCH 415-c may also specify a waveform indicator that indicates a type of waveform that the UE 115-a is to use when generating an uplink transmission, or the UE 115-a may infer to use a particular waveform type based on whether the message instructs the UE 115-a to FDM DMRS. For example, the waveform indicator may be a single bit in DCI having a first value to indicate that the UE 115-a is to use a DFT-S-OFDM waveform, and a second value to indicate that the UE 115-a is to use a CP-OFDM waveform. In another example, if the message instructs the UE 115-a not to FDM DMRS, then the UE 115-a may infer that the UE 115-a is to use a DFT-S-OFDM waveform for the uplink transmission in the PUSCH 355. Otherwise, if the message instructs the UE 115-a to FDM DMRS, then the UE 115-a may infer that the UE 115-a is to use a CP-OFDM waveform.

In FIG. 5A, for example, the resource elements in the third symbol period 370-c of PUSCH 355-c only include DMRS 420-c on every other resource element, and the intervening resource elements are empty. Similarly, the resource elements in the tenth symbol period 375-c of PUSCH 355-c only include DMRS 440-c on every other resource element, and the intervening resource elements are empty. The DMRS 420-c in the third symbol period 370-c and the DMRS 440-c in the tenth symbol period 375-c of TTI 405-c are time division multiplexed with UCI and UL-SCH data that are transported in different symbol periods of TTI 405-c. For example, UCI is depicted as CSI part 1 430-c and CSI part 2 435-c. CSI part 1 430-c is transported in the fourth through the eighth symbol periods of TTI 405-c, and CSI part 2 435-c is transported in the eleventh through the fourteenth symbol periods of TTI 405-c.

Figure 5B:
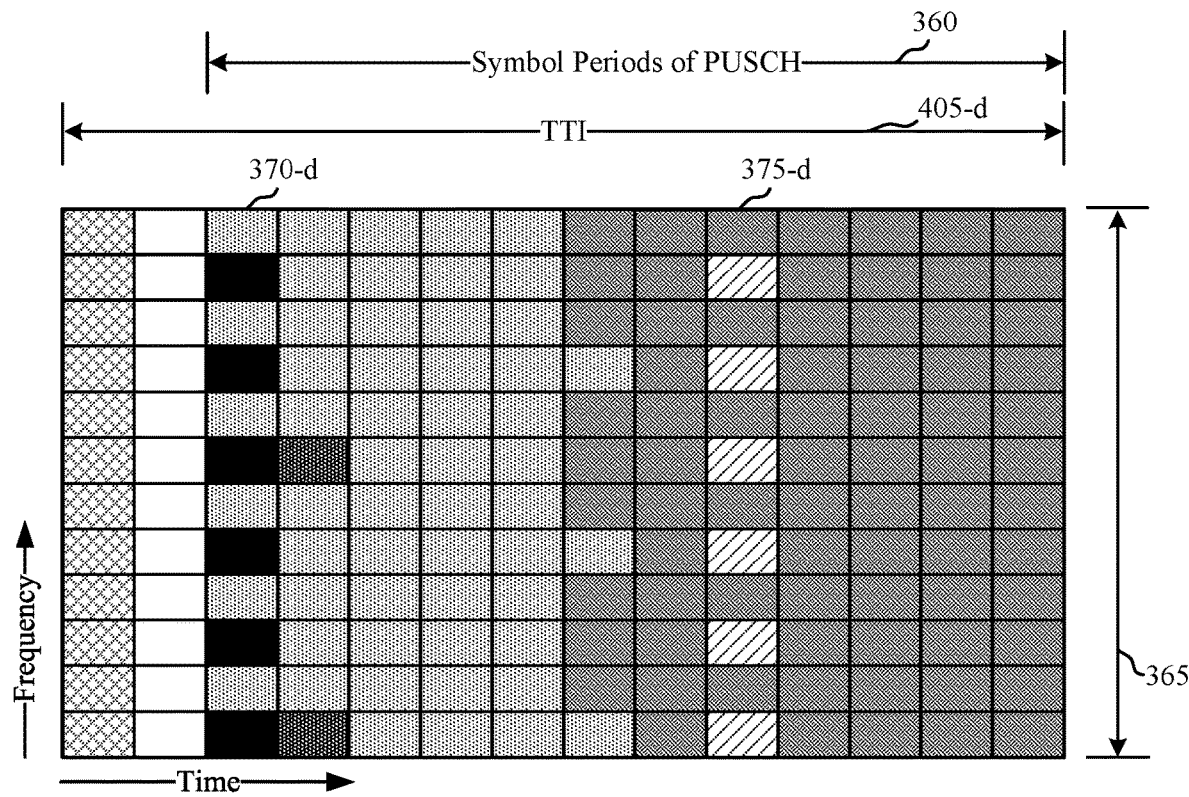

In another example, DCI in PDCCH may include a grant of resources in PUSCH and a message instructing the UE 115-a to FDM DMRS with UCI. FIG. 5B illustrates an example diagram 500-b of piggybacking UCI on PUSCH without UL-SCH data that supports controlling multiplexing of a reference signal on an uplink shared channel, in accordance with one or more aspects of the present disclosure. TTI 405-d may be an example of TTIs 405-a, 405-b, and 405-c.

In the depicted example, DCI in PDCCH 415-d may include a grant of resources in PUSCH 355-d and a message instructing the UE 115-a to FDM DMRS. The message may also specify a waveform type that the UE 115-a is to use, or the UE 115-a may infer to use a particular waveform type based on the message instructing the UE 115-a to FDM DMRS. For example, if the message instructs the UE 115-a to FDM DMRS, then the UE 115-a may infer that the UE 115-a is to use a CP-OFDM waveform for the uplink transmission in the PUSCH 355-d. Using a CP-OFDM waveform may enable the UE 115-a to FDM DMRS with UCI within a particular symbol period.

In FIG. 5B, for example, the resource elements in the third symbol period 370-d of PUSCH 355-d include DMRS 420-d on every other resource element, and the intervening resource elements include UCI, depicted as CSI part 1 data 430-d. Similarly, the resource elements in the tenth symbol period 375-d of PUSCH 355-d include DMRS 440-d on every other resource element, and the intervening resource elements include UCI, depicted as CSI part 2 data 435-d.

Figure 6A:
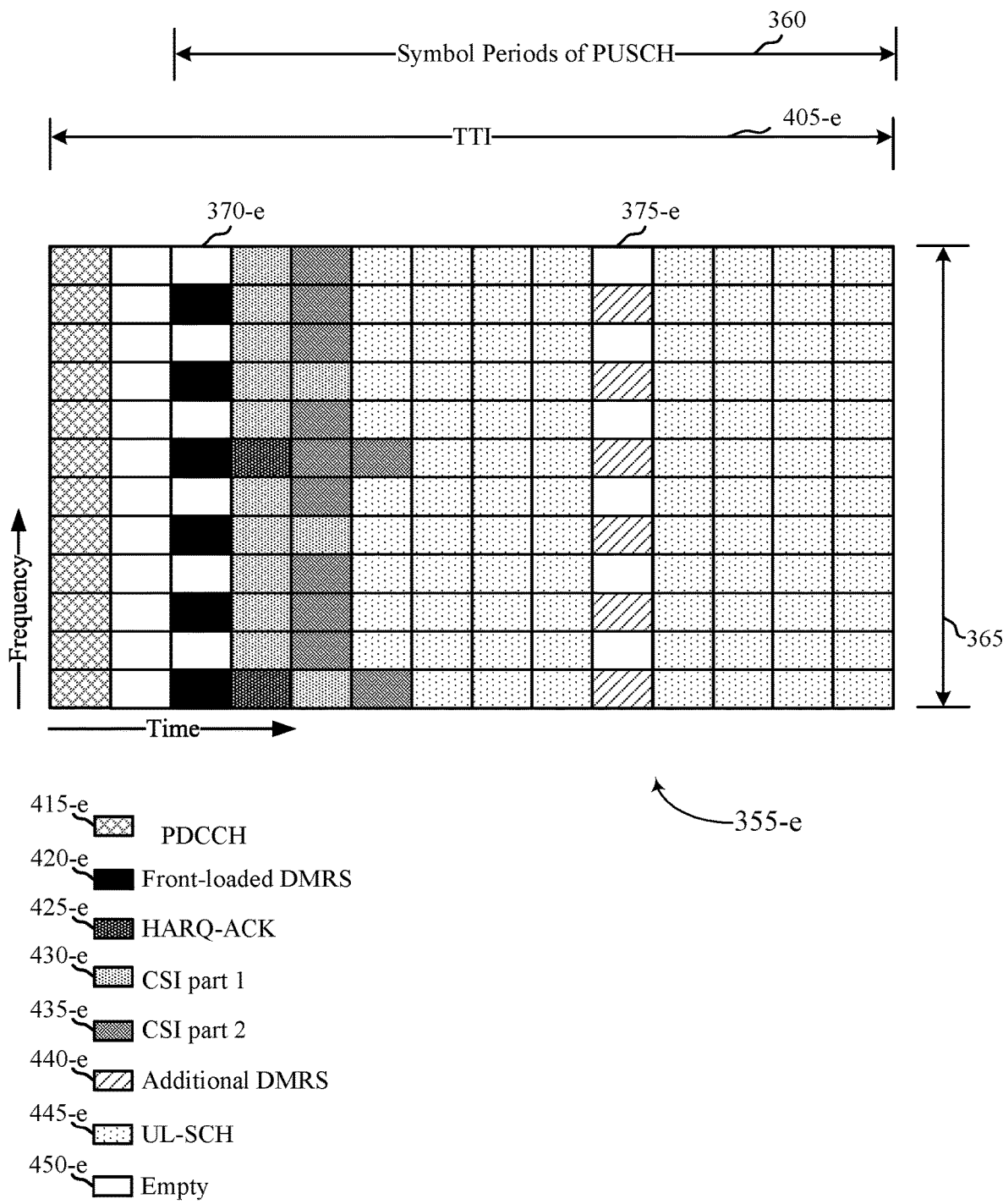
FIGS. 6A and 6B illustrate examples of time and frequency resources that support controlling multiplexing of a reference signal on an uplink shared channel in accordance with aspects of the present disclosure.

In some examples, the base station 105-a may send a message instructing the UE 115-a whether to FDM DMRS on a PUSCH transmission that includes UL-SCH data. FIG. 6A illustrates diagram 600-a of piggybacking UCI on PUSCH that supports controlling multiplexing of a reference signal on an uplink shared channel, in accordance with one or more aspects of the present disclosure. TTI 405-e may be an example of TTIs 405-a, 405-b, 405-c, and 405-d.

In the depicted example, DCI in PDCCH 415-e may include a grant of resources in PUSCH 355-e and a message instructing the UE 115-a not to FDM DMRS. In some cases, the message may a single bit in DCI to indicate whether to FDM DMRS, or an index to a table, such as TABLE 1, as described herein. The message included in PDCCH 415-e may also specify a waveform type that the UE 115-a is to use, or the UE 115-a may infer to use a particular waveform type based on whether the message indicates to FDM DMRS.

In FIG. 6A, the message may indicate not to FDM DMRS, and the message may indicate, or the UE 115-a may infer from the message, to use a DFT-S-OFDM waveform for the uplink transmission. For example, to maintain a single-carrier waveform, when PUSCH transmission is to be a DFT-OFDM waveform, the UE 115-a may not FDM DMRS with UCI and/or UL-SCH data, even when the DMRS includes a comb-like structure. Instead, the UE 115-a may TDM DMRS with UCI and UL-SCH data.

In the depicted example, the resource elements in the third symbol period 370-e of PUSCH 355-e only include DMRS 420-e on every other resource element, and the intervening resource elements are empty. Similarly, the resource elements in the tenth symbol period 375-e of PUSCH 355-e only include DMRS 440-e on every other resource element, and the intervening resource elements are empty. The DMRS 420-e in the third symbol period 370-e and the DMRS 440-e in the tenth symbol period 375-e of TTI 405-e are time division multiplexed with UCI and UL-SCH data that are transported in different symbol periods of TTI 405-e. For example, UCI is depicted as CSI part 1 430-e and CSI part 2 435-e. CSI part 1 430-e is transported in the fourth and fifth symbol periods of TTI 405-e, and CSI part 2 435-e is transported in the fifth and sixth symbol periods of TTI 405-e. UL-SCH data 445-e is transported in the sixth through ninth and eleventh through fourteenth symbols of the TTI 405-e.

Figure 6B:
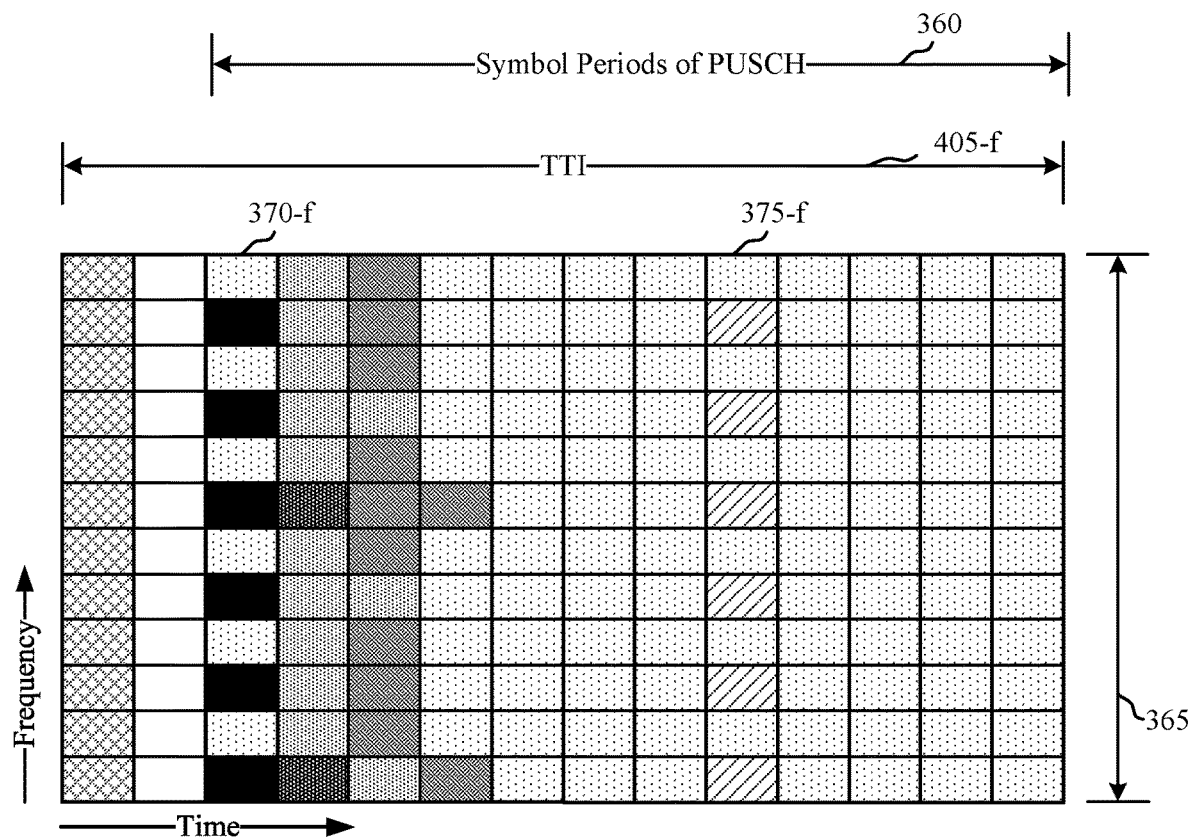

FIG. 6B illustrates an example diagram 600-b of piggybacking UCI on PUSCH that supports controlling multiplexing of a reference signal on an uplink shared channel, in accordance with one or more aspects of the present disclosure. TTI 405-f may be an example of TTIs 405-a, 405-b, 405-c, 405-d, 405-e, and 405-f In the depicted example, a message in PDCCH 415-f of TTI 405-f may include a grant of resources in PUSCH 355-f and a message instructing the UE 115-a to FDM DMRS. In some cases, the message may a single bit in DCI to indicate whether to FDM DMRS, or an index to a table, such as TABLE 1, as described herein. The message included in PDCCH 415-f may also specify a waveform type that the UE 115-a is to use, or the UE 115-a may infer to use a particular waveform type based on whether the message indicates to FDM DMRS.

In FIG. 6B, the message may indicate to FDM DMRS, and the message may indicate, or the UE 115-a may infer from the message, to use a CP-OFDM waveform for the uplink transmission. A PUSCH transmission generated using a CP-OFDM waveform beneficially may permit frequency division multiplexing of DMRS with UCI and/or UL-SCH data in a same symbol period.

In the depicted example, the resource elements in the third symbol period 370-f of PUSCH 355-f include DMRS 420-f on every other resource element, and the intervening resource elements include UL-SCH data 445-f. Similarly, the resource elements in the tenth symbol period 375-f of PUSCH 355-f include DMRS 440-f on every other resource element, and the intervening resource elements include UL-SCH data 445-f.

Based on the waveform type and whether instructed to FDM DMRS, the UE 115-a may generate a waveform (e.g., a CP-OFDM waveform, a DFT-S-OFDM waveform) (see, for example, FIG. 2) based on the how the different information and/or data are mapped to the resource elements of the PUSCH 355 in any of FIGS. 4-6. For example, UCI that is CSI part 1 and CSI part 2 may be mapped to the resource elements of PUSCH 355 as shown in any of FIGS. 4-6, UL-SCH data may be mapped to the resource elements of PUSCH 355 as shown in any of FIGS. 4-6, and so forth. The UE 115-*a* may transmit the waveform within the resource elements of the uplink shared channel allocated in the grant as an uplink transmission to the base station 105-*a*.

Figure 7:
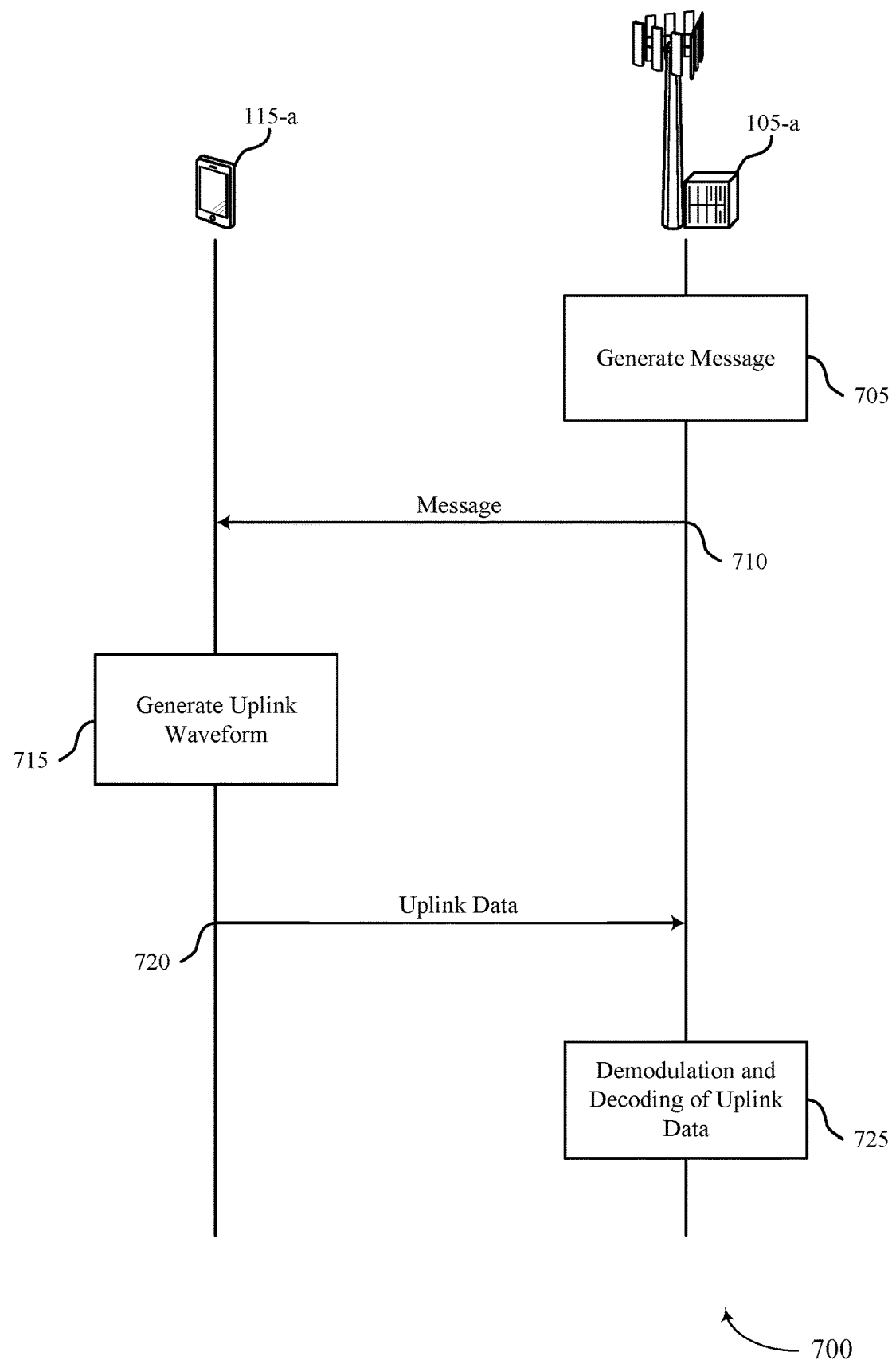
FIG. 7 illustrates an example of a process flow that supports controlling multiplexing of a reference signal on an uplink shared channel in accordance with aspects of the present disclosure.

FIG. 7 illustrates an example of a process flow 700 in a system that supports controlling multiplexing of a reference signal on an uplink shared channel, in accordance with various aspects of the present disclosure. In some examples, process flow 700 may implement aspects of wireless communications system 100. For example, process flow 700 includes UE 115-*a* and base station 105-*a*, which may be examples of the corresponding devices described with reference to FIG. 1.

At 705, base station 105-*a* may generate a message indicating a grant of resources within an uplink shared channel and whether UE 115-*a* is to FDM a DMRS within a symbol period of the granted resources. Base station 105-*a* may transmit the message 710 to the UE 115-*a* within a control channel. Message 710 may include a single bit indication or an index that is jointly encoded signaling, as described herein. The message 710 may be sent in DCI and/or via RRC signaling.

The UE 115-*a* may receive and process the message 710. In some examples, the UE 115-*a* may identify a resource block within an uplink shared channel allocated to the UE 115-*a* for an uplink transmission, a waveform type for the uplink transmission, and whether to FDM a DMRS with a symbol period of the resource block.

At 715, the UE 115-*a* may generate an uplink waveform based on the waveform type and whether the message indicates to FDM a DMRS with a symbol period of the resource block. For example, the message may indicate that the UE 115-*a* is to FDM DMRS with UCI and/or UL-SCH data. In another example, the message may indicate that the UE 115-*a* is not to FDM DMRS with UCI and/or UL-SCH data, and instead to TDM DMRS with UCI and/or UL-SCH data.

At 720, UE 115-*a* may transmit the uplink waveform as an uplink transmission within the allocated resource block of the uplink shared channel.

At 725, base station 105-*a* may monitor the allocated resource block of the uplink shared channel for an uplink waveform that is generated in accordance with the message 710. In an example, base station 105-*a* may demodulate and decode at least a portion of the coded modulation symbols of the uplink shared channel corresponding to the allocated resource block. The base station 105-*a* may, for example, attempt to decode some or all of the resource elements of an allocated resource block to obtain UCI (e.g., CSI part 1, CSI part 2), UL-SCH data, DMRS, in any combination, from an uplink transmission in the PUSCH 355. The base station 105-*a* may provide acknowledgement feedback to the UE 115-*a* to indicate whether the decoding of some or all resource elements of the allocated resource block passed a cyclic redundancy check (CRC).

In an example, the base station 105-*a* may decode a first subset of a set of resource elements within the symbol period (e.g., symbol period 370 or 375 of any of FIGS. 4-6) of the resource block in accordance with the message to obtain the DMRS, regardless of whether DMRS is frequency or time division multiplexed. The base station 105-*a* may use the DMRS for channel estimation. If the DMRS is frequency division multiplexed with UCI and/or UL-SCH data in a particular symbol period, in accordance with message 710, the base station 105-*a* may decode a second subset of the set of resource elements (see, for example, symbol period 370 of FIGS. 5B and 6B) within the symbol period of the resource block to obtain UCI and/or UL-SCH data. If the DMRS is not frequency division multiplexed with UCI and/or UL-SCH data in a particular symbol period, in accordance with message 710, the base station 105-*a* may skip decoding of the second subset of the set of resource elements (see, for example, symbol period 370 of FIGS. 5A and 6A).

Beneficially, the techniques described herein may provide for piggybacking UCI on a PUSCH transmission, and control multiplexing of DMRS with UCI and/or UL-SCH data to enhance resource utilization and to communicate in accordance with a waveform type having desired properties.

Figure 8:
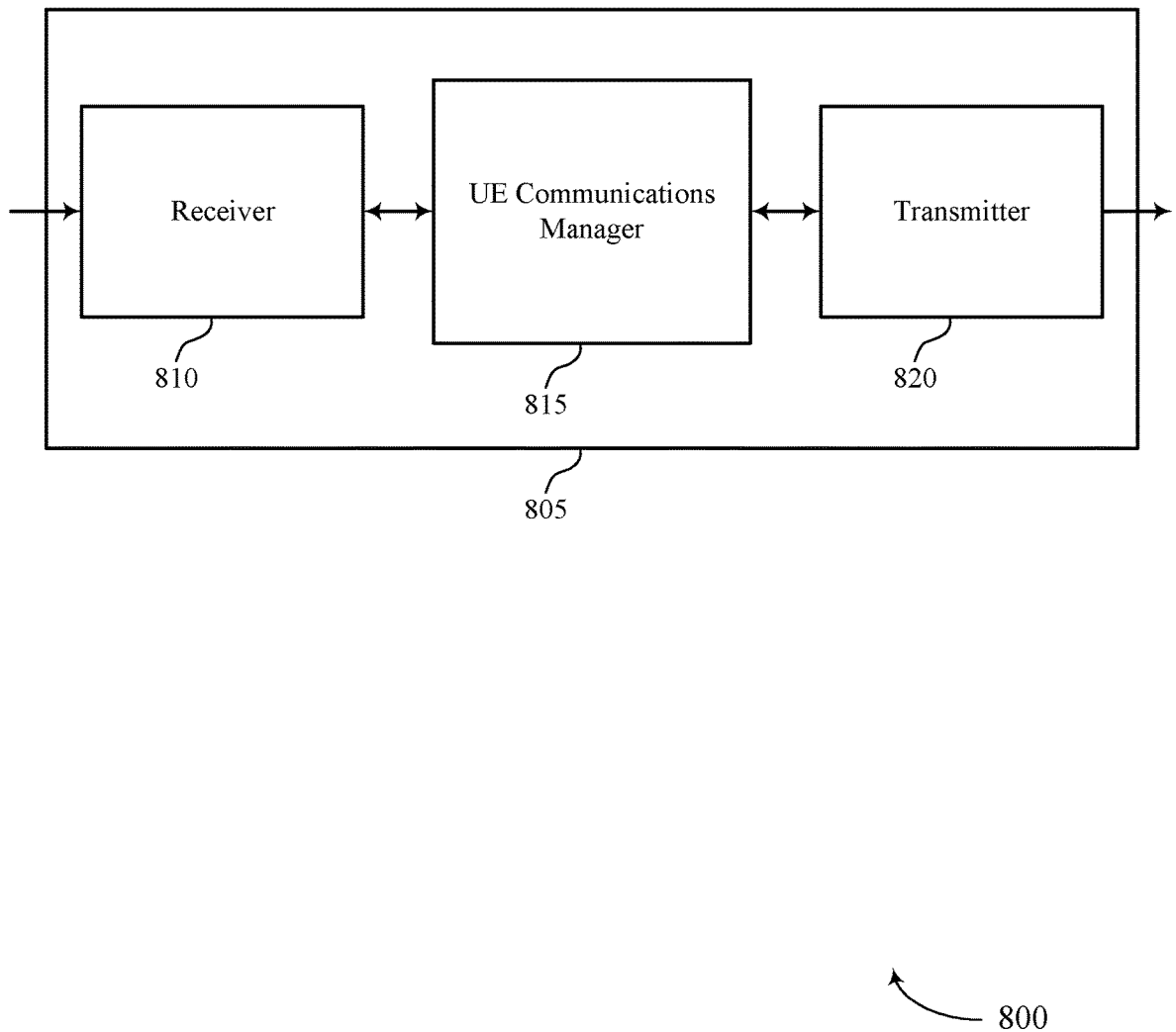
FIGS. 8 through 10 show block diagrams of a device that supports controlling multiplexing of a reference signal on an uplink shared channel in accordance with aspects of the present disclosure.

FIG. 8 shows a block diagram 800 of a wireless device 805 that supports controlling multiplexing of a reference signal on an uplink shared channel, in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to controlling frequency division multiplexing of a reference signal on an uplink shared channel, etc.). Information may be passed on to other components of the device. The receiver 810 may be an example of aspects of the transceiver 1135 described with reference to FIG. 11. The receiver 810 may utilize a single antenna or a set of antennas.

In some cases, receiver 810 may receive, by a UE, a grant allocating a resource block of an uplink shared channel for an uplink transmission, determine, by the UE, a mapping for the resource block that includes time division multiplexing a demodulation reference signal and uplink control information to different symbol periods of the resource block, and transmit an uplink waveform within the resource block based on the mapping. In other cases, receiver 810 may receive by a UE, a message indicating whether the UE is to frequency division multiplex a demodulation reference signal within a symbol period of a resource block of an uplink shared channel. In some cases, the message indicates an index to a table that indicates a set of parameters for the resource block. In some cases, the index jointly signals the set of parameters to the UE.

The UE communications manager 815 may determine, by the UE, a mapping for the resource block that includes time division multiplexing a demodulation reference signal and uplink control information to different symbol periods of the resource block. The UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Transmitter 820 may transmit an uplink waveform within the resource block based on the mapping. The transmitter 820 may transmit the uplink waveform within the resource block of the uplink shared channel.

Figure 9:
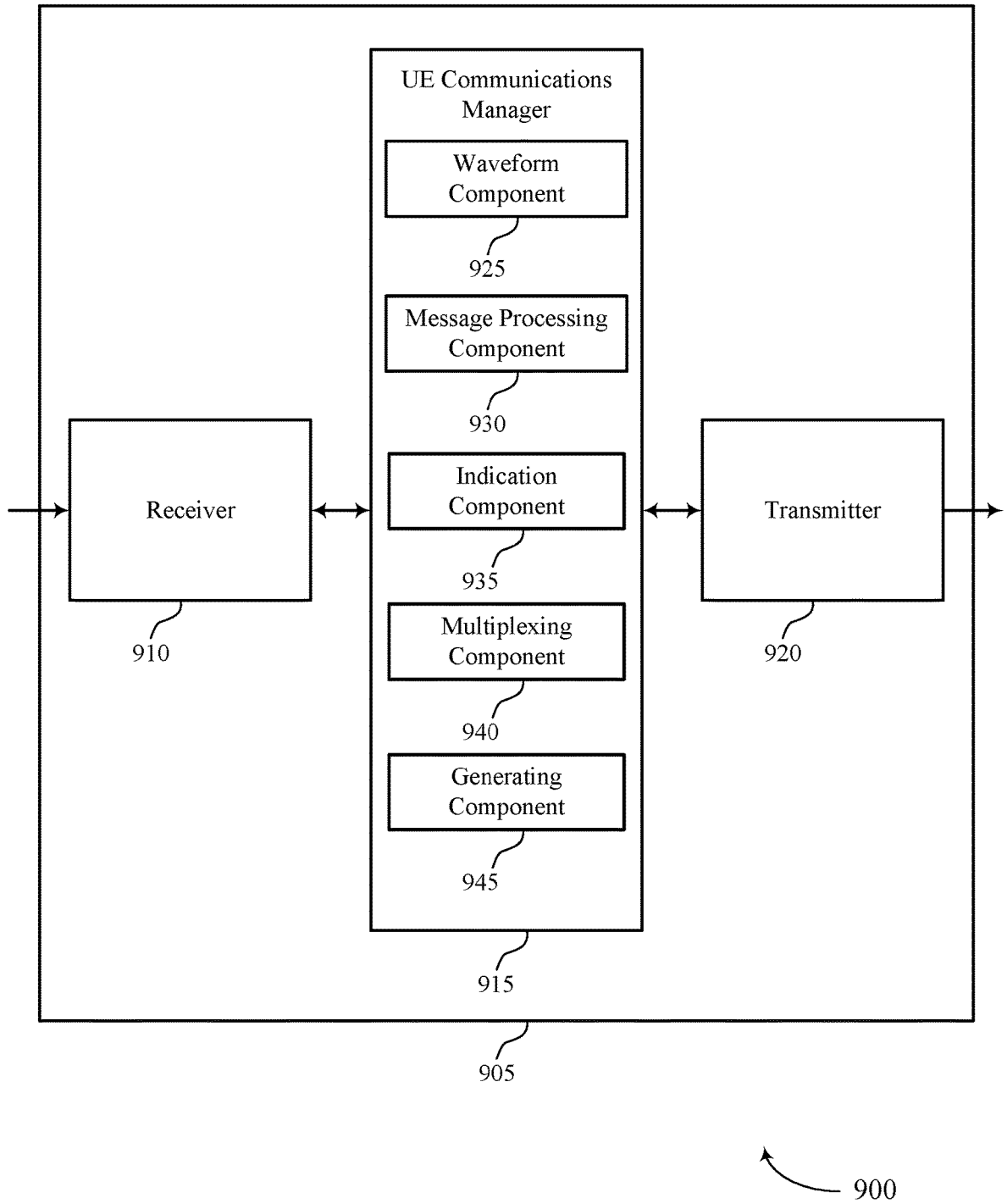

FIG. 9 shows a block diagram 900 of a wireless device 905 that supports controlling multiplexing of a reference signal on an uplink shared channel, in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to controlling frequency division multiplexing of a reference signal on an uplink shared channel, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. The UE communications manager 915 may include a waveform component 925, message processing component 930, indication component 935, multiplexing component 940, and generating component 945. The UE communications manager 915 may be an example of aspects of the UE communications manager 1115 described herein.

Waveform component 925 may generate an uplink waveform based on the message, generate the uplink waveform in accordance with a waveform indicator that indicates a type of the uplink waveform, generate the uplink waveform based on the UCI and the mapping, generate uplink data, and generate the uplink waveform based on the uplink data and the second mapping. In some cases, the type specifies a discrete Fourier transport spread orthogonal frequency division multiplex (DFT-S-OFDM) waveform or a cyclic prefix orthogonal frequency division multiplex (CP-OFDM) waveform.

Message processing component 930 may receive a message indicating whether the UE 115 is to frequency division multiplex a demodulation reference signal within a symbol period of a resource block of an uplink shared channel.

The indication component 935 may receive, by a UE, a grant allocating a resource block of an uplink shared channel for an uplink transmission.

The multiplexing component 940 may determine, by the UE, a mapping for the resource block that includes time division multiplexing a demodulation reference signal and uplink control information to different symbol periods of the resource block.

The generating component 945 may transmit an uplink waveform within the resource block based on the mapping.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
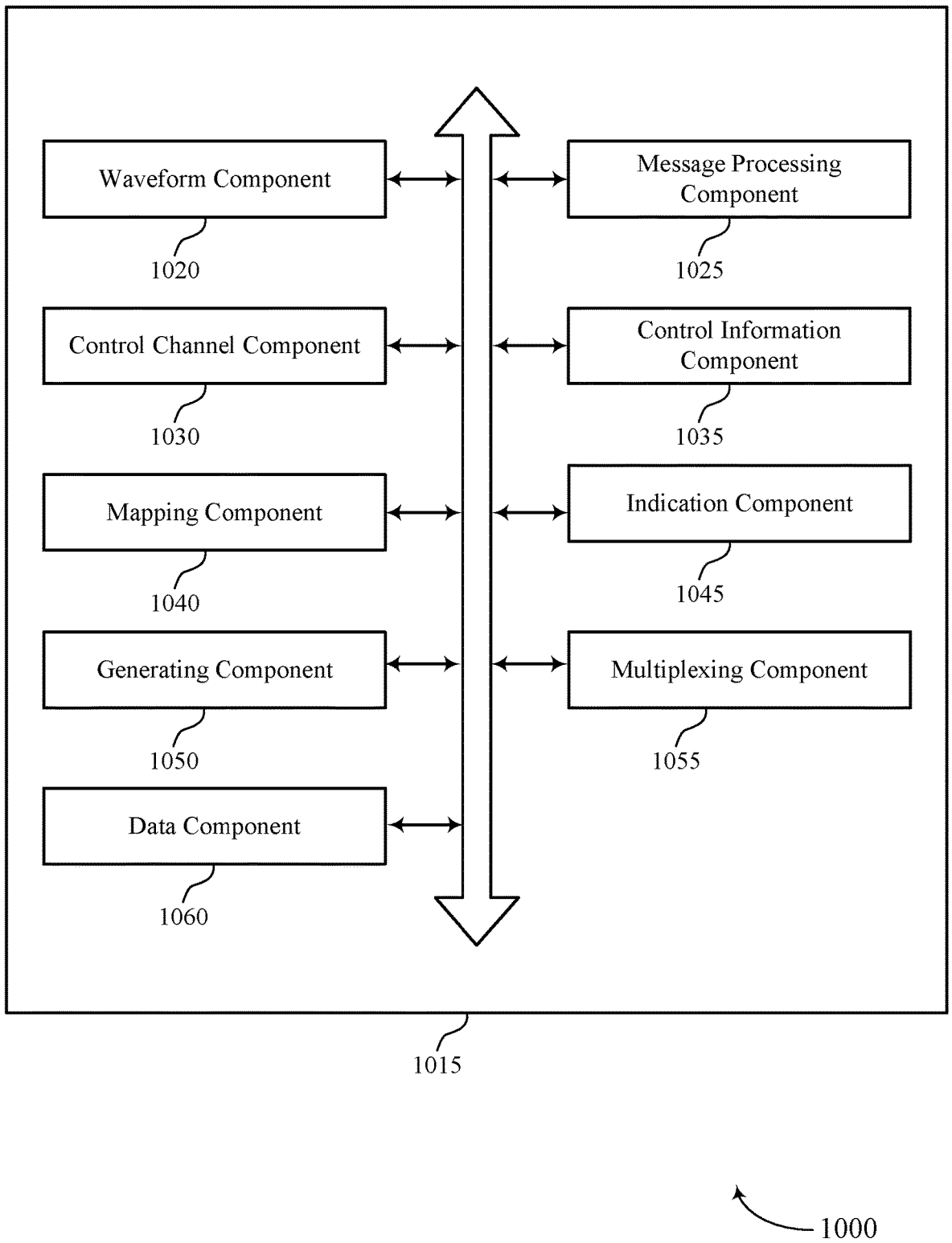

FIG. 10 shows a block diagram 1000 of a UE communications manager 1015 that supports controlling multiplexing of a reference signal on an uplink shared channel, in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include waveform component 1020, message processing component 1025, control channel component 1030, control information component 1035, and mapping component 1040. Each of these modules may communicate, directly or indirectly, with one another (e.g., via one or more buses).

Waveform component 1020 may generate, by the UE, an uplink waveform based on the message. Waveform component 1020 may generate the uplink waveform in accordance with a waveform indicator that indicates a type of the uplink waveform, or generate the uplink waveform based on the UCI and the mapping, generate uplink data, and generate the uplink waveform based on the uplink data and the second mapping. In some cases, the type specifies a discrete Fourier transport spread orthogonal frequency division multiplex (DFT-S-OFDM) waveform or a cyclic prefix orthogonal frequency division multiplex (CP-OFDM) waveform.

Message processing component 1025 may process the message to determine that a demodulation reference signal is to be frequency division multiplexed with uplink control information or uplink data within the symbol period of the resource block or determine that the demodulation reference signal is not to be frequency division multiplexed with uplink control information or uplink data within the symbol period of the resource block, and that the demodulation reference signal is to be time division multiplexed with uplink control information or uplink data within the resource block.

Control channel component 1030 may process, at the UE, a control channel corresponding to the resource block to obtain downlink control information (DCI) that includes a message. In some cases, the message is a single bit included in the DCI.

Control information component 1035 may generate uplink control information (UCI). In some cases, the UCI includes at least one of channel state information (CSI) data, or CSI part 1 data, or CSI part 2 data, or acknowledgement data.

Mapping component 1040 may determine a mapping that maps the UCI to at least resource element of the resource block and determine a second mapping that maps the uplink data to at least resource element of the resource block.

The indication component 1045 may receive, by a UE, a grant allocating a resource block of an uplink shared channel for an uplink transmission. In some examples, the indication component 1045 may receive, from the base station, radio resource control signaling including a waveform indicator that indicates a type of the uplink waveform.

In some cases, the uplink control information includes a hybrid automatic repeat request acknowledgement indication. In some cases, the uplink control information includes control state information part 1 data that includes at least one of a rank indicator, a channel state information reference signal index, or a channel quality indicator. In some cases, the uplink control information includes control state information part 2 data that includes at least one of a precoding matrix indicator, or a channel quality indicator.

The generating component 1050 may transmit an uplink waveform within the resource block based on the mapping.

In some examples, the generating component 1050 may generate the uplink waveform in accordance with a waveform indicator of the grant that indicates a type of the uplink waveform. In some cases, the type of the uplink waveform specifies a discrete Fourier transport spread orthogonal frequency division multiplex (DFT-S-OFDM) waveform or a cyclic prefix orthogonal frequency division multiplex (CP-OFDM) waveform.

The multiplexing component 1055 may determine, by the UE, a mapping for the resource block that includes time division multiplexing a demodulation reference signal and uplink control information to different symbol periods of the resource block.

In some examples, the multiplexing component 1055 may determine the mapping for the resource block that maps the demodulation reference signal to resource elements of a first symbol period of the resource block and maps the uplink control information to resource elements of a second symbol period of the resource block, the second symbol period distinct from the first symbol period.

In some cases, the resource elements of the first symbol period are separated by one or more intervening resource elements. In some cases, the one or more intervening resource elements are empty. In some cases, the one or more intervening resource elements include uplink data.

The data component 1060 may determine the mapping for the resource block that frequency division multiplexes the demodulation reference signal and uplink data in at least one symbol period of the resource block. In some examples, the data component 425 may determine the mapping for the resource block that does not frequency division multiplex the demodulation reference signal and uplink data within any symbol period of the resource block.

Figure 11:
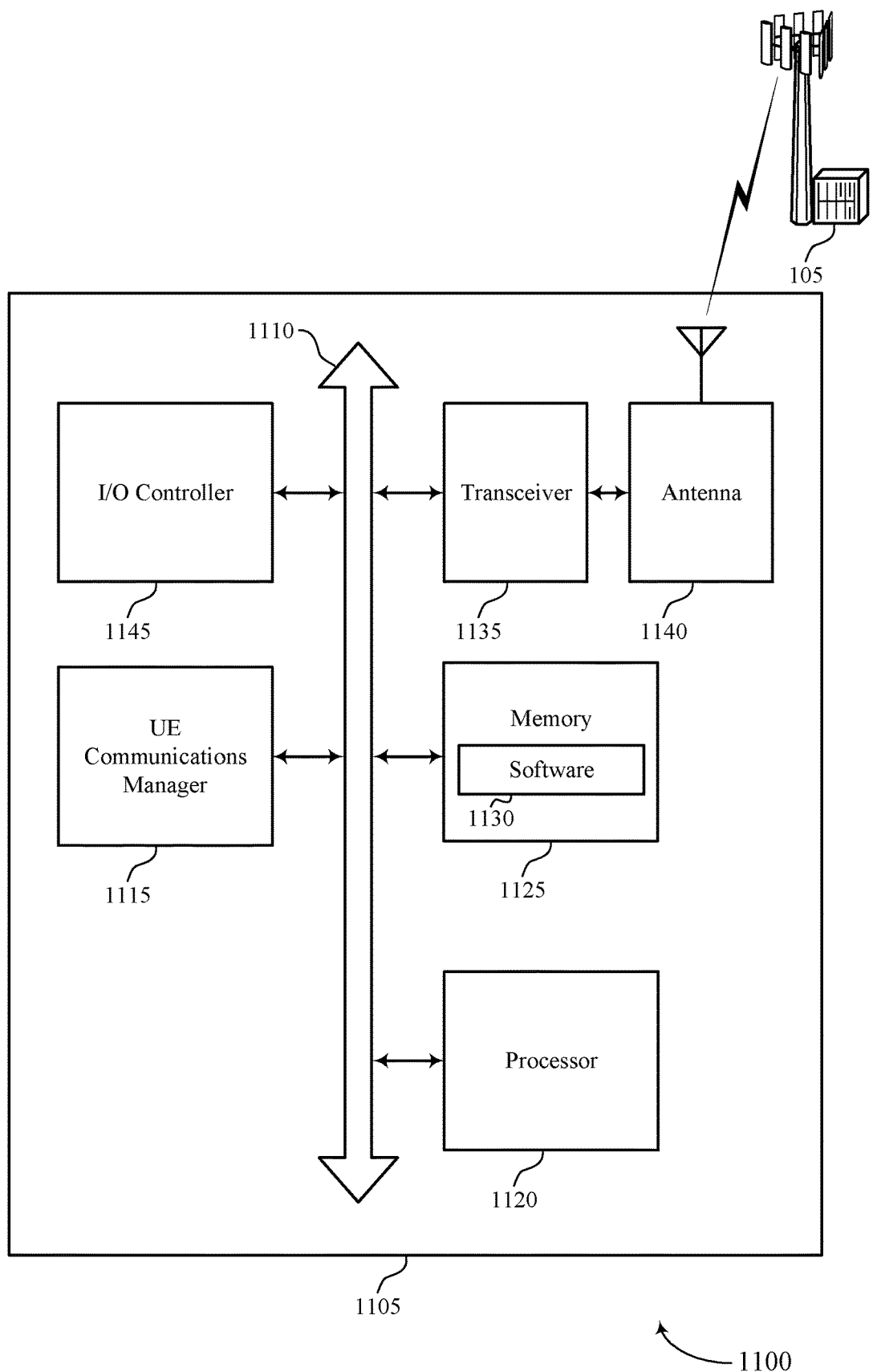
FIG. 11 illustrates a block diagram of a system including a UE that supports controlling multiplexing of a reference signal on an uplink shared channel in accordance with aspects of the present disclosure.

FIG. 11 shows a diagram of a system 1100 including a device 1105 that supports controlling multiplexing of a reference signal on an uplink shared channel, in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting controlling frequency division multiplexing of a reference signal on an uplink shared channel).

Memory 1125 may include random access memory (RAM) and read-only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support controlling frequency division multiplexing of a reference signal on an uplink shared channel. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above, e.g., with reference to FIGS. 8-10. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
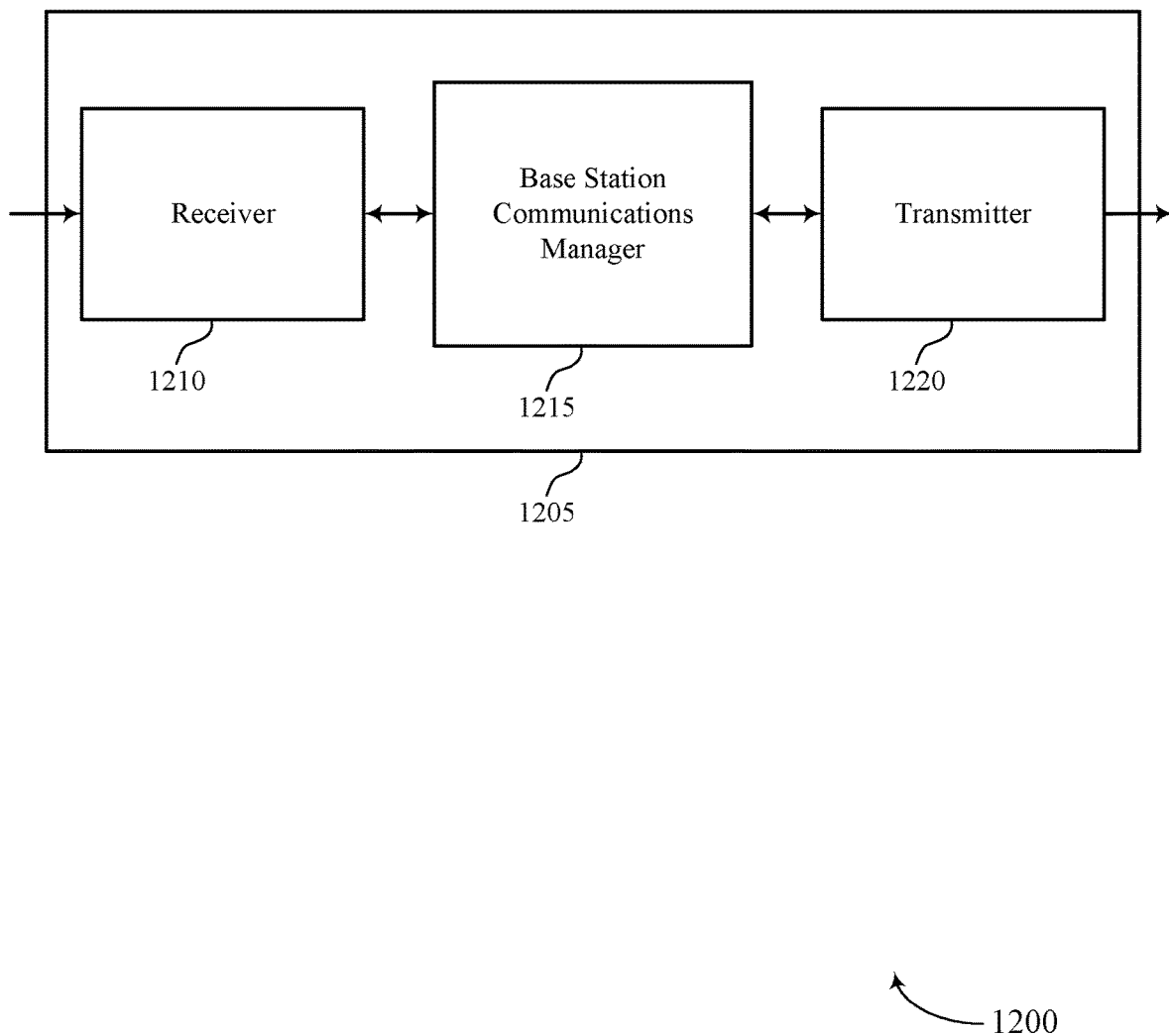
FIGS. 12 through 14 show block diagrams of a device that supports controlling multiplexing of a reference signal on an uplink shared channel in accordance with aspects of the present disclosure.

FIG. 12 shows a block diagram 1200 of a wireless device 1205 that supports controlling multiplexing of a reference signal on an uplink shared channel, in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to controlling frequency division multiplexing of a reference signal on an uplink shared channel, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may generate, by a base station, a message indicating whether a UE is to frequency division multiplex a demodulation reference signal within a symbol period of a resource block of an uplink shared channel and monitor, by the base station, the resource block of the uplink shared channel for an uplink waveform that is generated based on the message.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Transmitter 1220 may transmit the message to the UE, transmit the DCI in a control channel corresponding to the resource block, and transmit a waveform indicator to the UE for indicating a type of the uplink waveform. In some cases, the type specifies a discrete Fourier transport spread orthogonal frequency division multiplex (DFT-S-OFDM) waveform or a cyclic prefix orthogonal frequency division multiplex (CP-OFDM) waveform.

Figure 13:
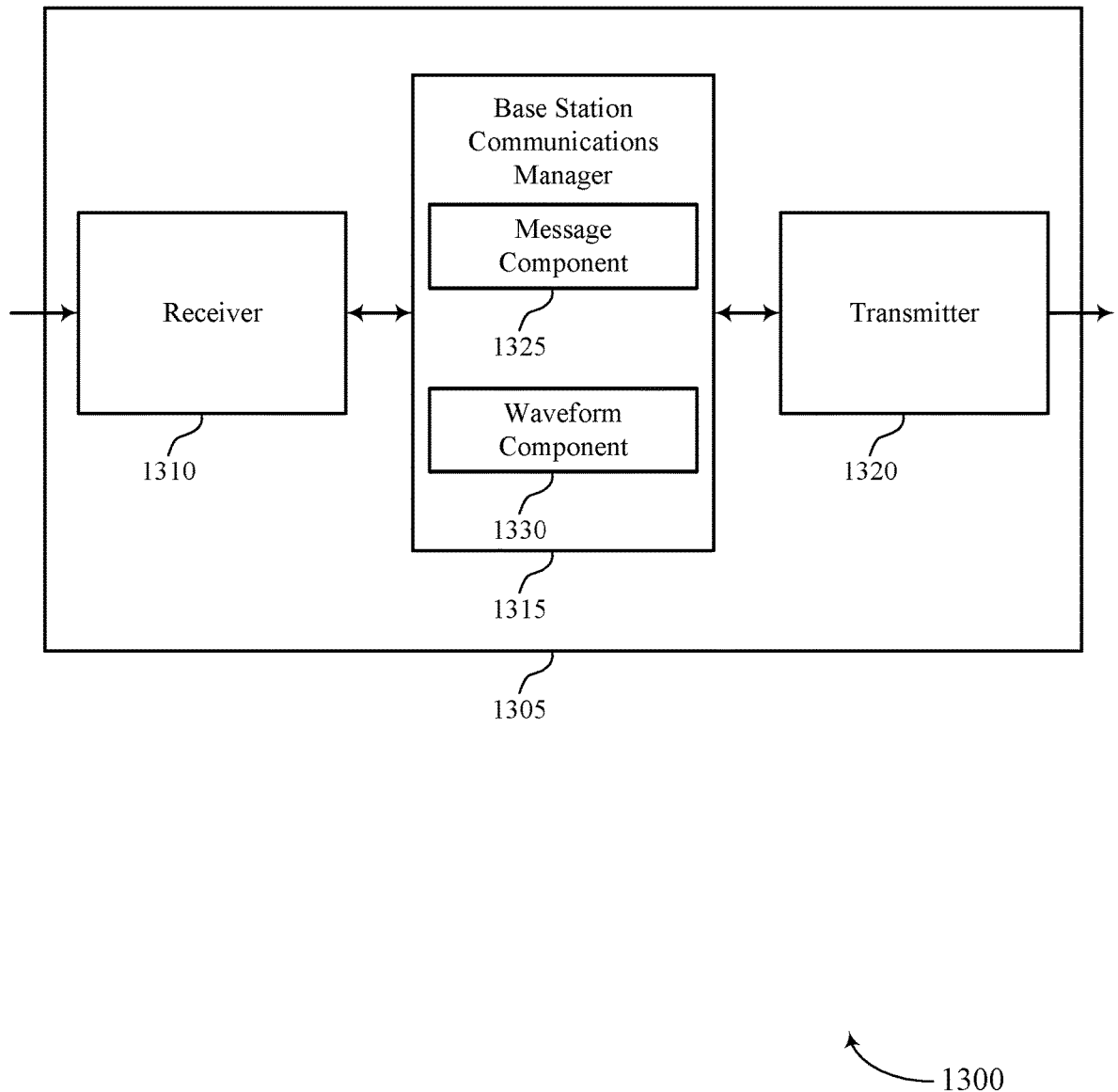

FIG. 13 shows a block diagram 1300 of a wireless device 1305 that supports controlling multiplexing of a reference signal on an uplink shared channel, in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to controlling frequency division multiplexing of a reference signal on an uplink shared channel, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include message component 1325 and waveform component 1330.

Message component 1325 may generate, by a base station, a message indicating whether a UE is to frequency division multiplex a demodulation reference signal within a symbol period of a resource block of an uplink shared channel. In some cases, the message indicates an index to a table that indicates a set of parameters for the resource block. In some cases, the index jointly signals the set of parameters to the UE. Waveform component 1330 may monitor, by the base station, the resource block of the uplink shared channel for an uplink waveform that is generated based on the message.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
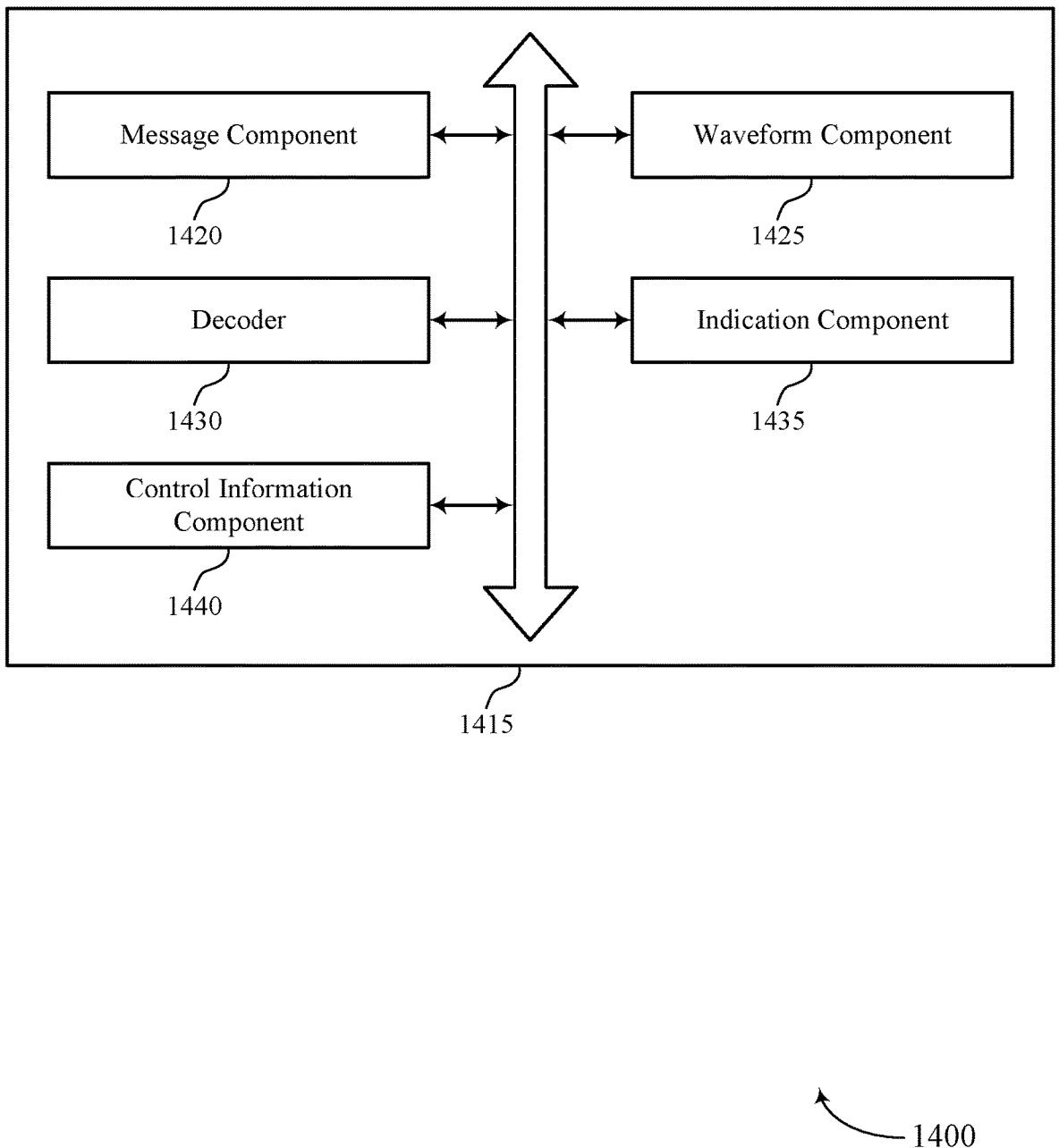

FIG. 14 shows a block diagram 1400 of a base station communications manager 1415 that supports controlling multiplexing of a reference signal on an uplink shared channel, in accordance with aspects of the present disclosure. The base station communications manager 1415 may be an example of aspects of a base station communications manager 1515 described with reference to FIGS. 12, 13, and 15. The base station communications manager 1415 may include message component 1420, waveform component 1425, decoder 1430, indication component 1435, and control information component 1440. Each of these modules may communicate, directly or indirectly, with one another (e.g., via one or more buses).

Message component 1420 may generate, by a base station, a message indicating whether a UE is to frequency division multiplex a demodulation reference signal within a symbol period of a resource block of an uplink shared channel. In some cases, the message indicates an index to a table that indicates a set of parameters for the resource block. In some cases, the index jointly signals the set of parameters to the UE.

Indication component 1435 may set the message to indicate that the demodulation reference signal is to be frequency division multiplexed with uplink control information or uplink data within the symbol period of the resource block or set the message to indicate that the demodulation reference signal is not to be frequency division multiplexed with uplink control information or uplink data within the symbol period of the resource block, and set the message to indicate that the demodulation reference signal is to be time division multiplexed with uplink control information or uplink data within the resource block.

Control information component 1440 may generate DCI that includes the message. In some cases, the message is a single bit included in the DCI.

Waveform component 1425 may monitor, by the base station, the resource block of the uplink shared channel for an uplink waveform that is generated based on the message.

Decoder 1430 may decode a first subset of a set of resource elements within the symbol period of the resource block in accordance with the message to obtain the demodulation reference signal, skip decoding a second subset of the set of resource elements within the symbol period of the resource block, decode a second subset of the set of resource elements within the symbol period of the resource block to obtain uplink control information or uplink data, decode the resource block to obtain uplink control information (UCI), and decode the resource block to obtain uplink data. In some cases, the UCI includes at least one of CSI data, or CSI part 1 data, or CSI part 2 data, or acknowledgement data.

Figure 15:
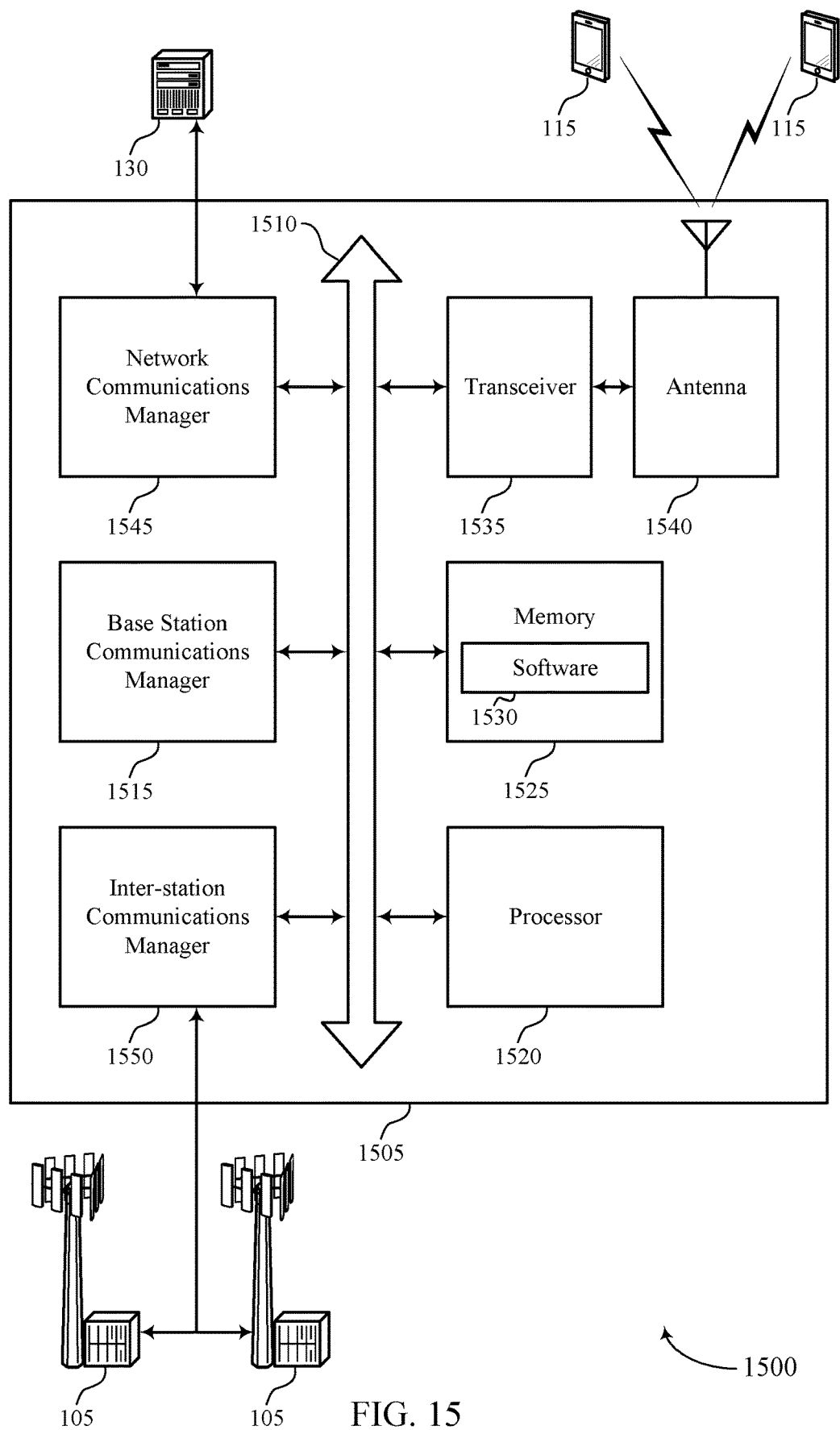
FIG. 15 illustrates a block diagram of a system including a base station that supports controlling multiplexing of a reference signal on an uplink shared channel in accordance with aspects of the present disclosure.

FIG. 15 shows a diagram of a system 1500 including a device 1505 that supports controlling multiplexing of a reference signal on an uplink shared channel, in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting controlling frequency division multiplexing of a reference signal on an uplink shared channel).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support controlling frequency division multiplexing of a reference signal on an uplink shared channel. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above, e.g., with reference to FIGS. 12-14. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
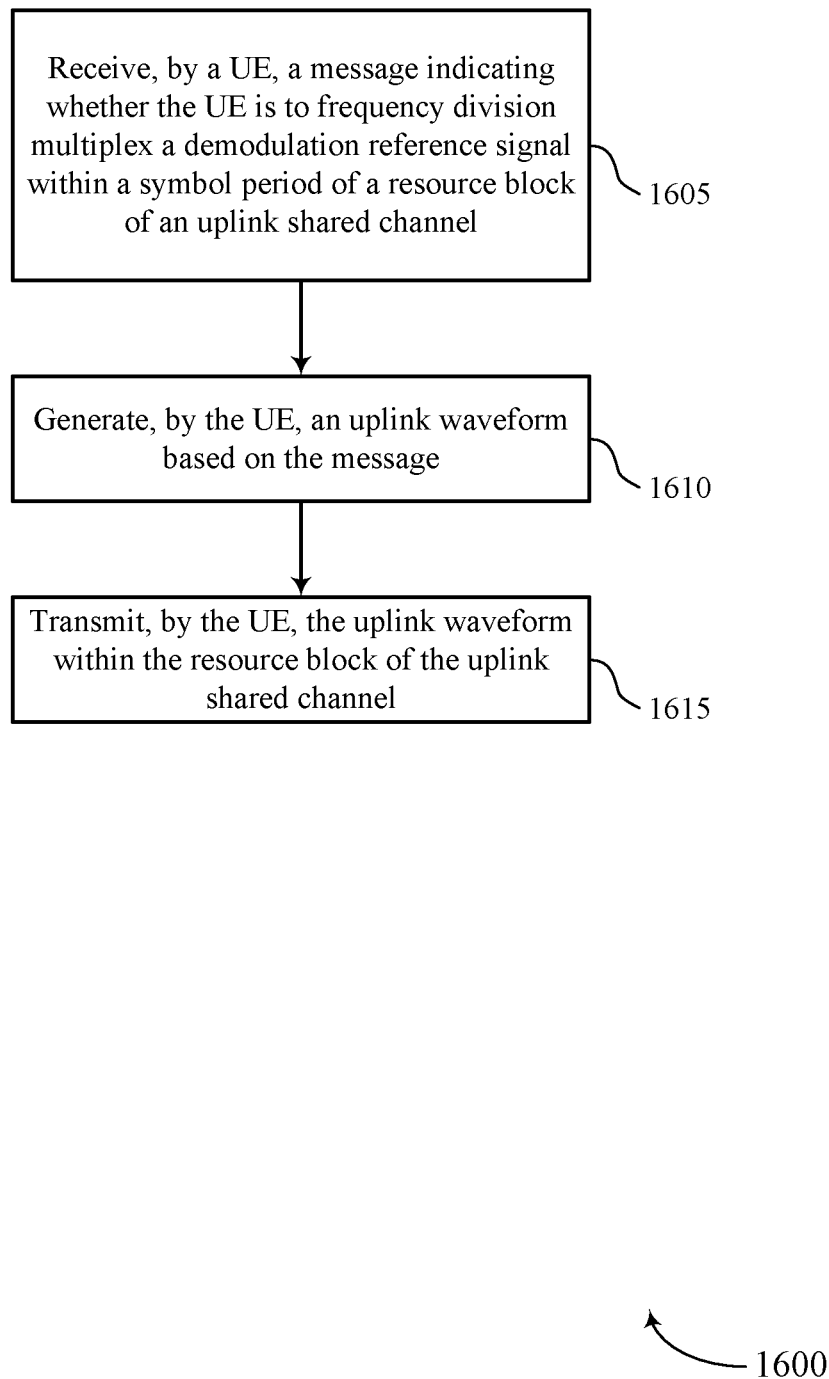
FIGS. 16 through 21 illustrate methods for controlling multiplexing of a reference signal on an uplink shared channel in accordance with aspects of the present disclosure.

FIG. 16 shows a flowchart illustrating a method 1600 for controlling multiplexing of a reference signal on an uplink shared channel in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, by a user equipment (UE), a message indicating whether the UE is to frequency division multiplex a demodulation reference signal within a symbol period of a resource block of an uplink shared channel. The operations of 1605 may be performed according to the methods described herein. In some examples, aspects of the operations of 1605 may be performed by a receiver as described with reference to FIGS. 8 through 11.

At 1610 the UE 115 may generate, by the UE, an uplink waveform based at least in part on the message. The operations of 1610 may be performed according to the methods described herein. In some examples, aspects of the operations of 1610 may be performed by a waveform component as described with reference to FIGS. 8 through 11.

At 1615 the UE 115 may transmit, by the UE, the uplink waveform within the resource block of the uplink shared channel. The operations of 1615 may be performed according to the methods described herein. In some examples, aspects of the operations of 1615 may be performed by a transmitter as described with reference to FIGS. 8 through 11.

Figure 17:
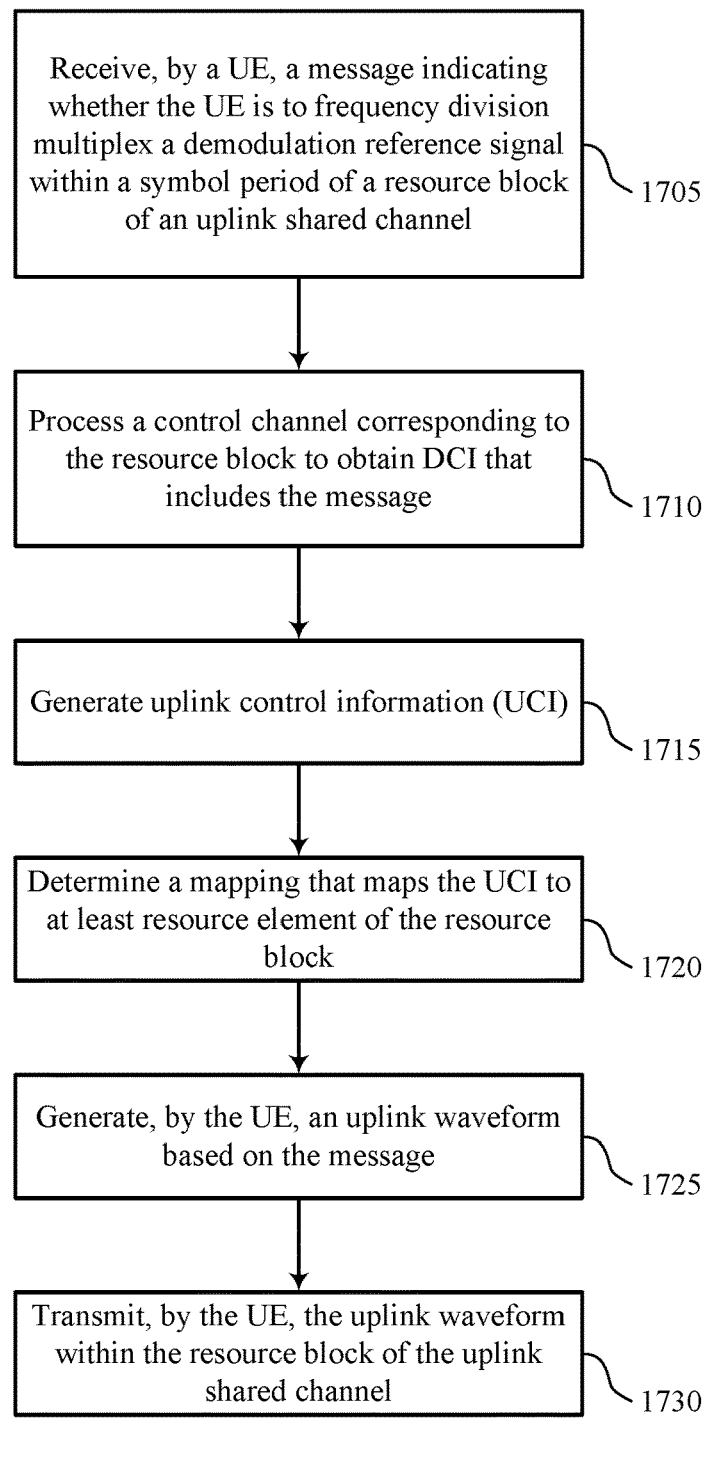

FIG. 17 shows a flowchart illustrating a method 1700 for controlling multiplexing of a reference signal on an uplink shared channel in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, by a user equipment (UE), a message indicating whether the UE is to frequency division multiplex a demodulation reference signal within a symbol period of a resource block of an uplink shared channel. The operations of 1705 may be performed according to the methods described herein. In some examples, aspects of the operations of 1705 may be performed by a receiver as described with reference to FIGS. 8 through 11.

At 1710 the UE 115 may process a control channel corresponding to the resource block to obtain downlink control information (DCI) that comprises the message. The operations of 1710 may be performed according to the methods described herein. In some examples, aspects of the operations of 1710 may be performed by a control channel component as described with reference to FIGS. 8 through 11.

At 1715 the UE 115 may generate uplink control information (UCI). The operations of 1715 may be performed according to the methods described herein. In some examples, aspects of the operations of 1715 may be performed by a control information component as described with reference to FIGS. 8 through 11.

At 1720 the UE 115 may determine a mapping that maps the UCI to at least resource element of the resource block. The operations of 1720 may be performed according to the methods described herein. In some examples, aspects of the operations of 1720 may be performed by a mapping component as described with reference to FIGS. 8 through 11.

At 1725 the UE 115 may generate, by the UE, an uplink waveform based at least in part on the message. The operations of 1725 may be performed according to the methods described herein. In some examples, aspects of the operations of 1725 may be performed by a waveform component as described with reference to FIGS. 8 through 11.

At 1730 the UE 115 may transmit, by the UE, the uplink waveform within the resource block of the uplink shared channel. The operations of 1730 may be performed according to the methods described herein. In some examples, aspects of the operations of 1730 may be performed by a transmitter as described with reference to FIGS. 8 through 11.

Figure 18:
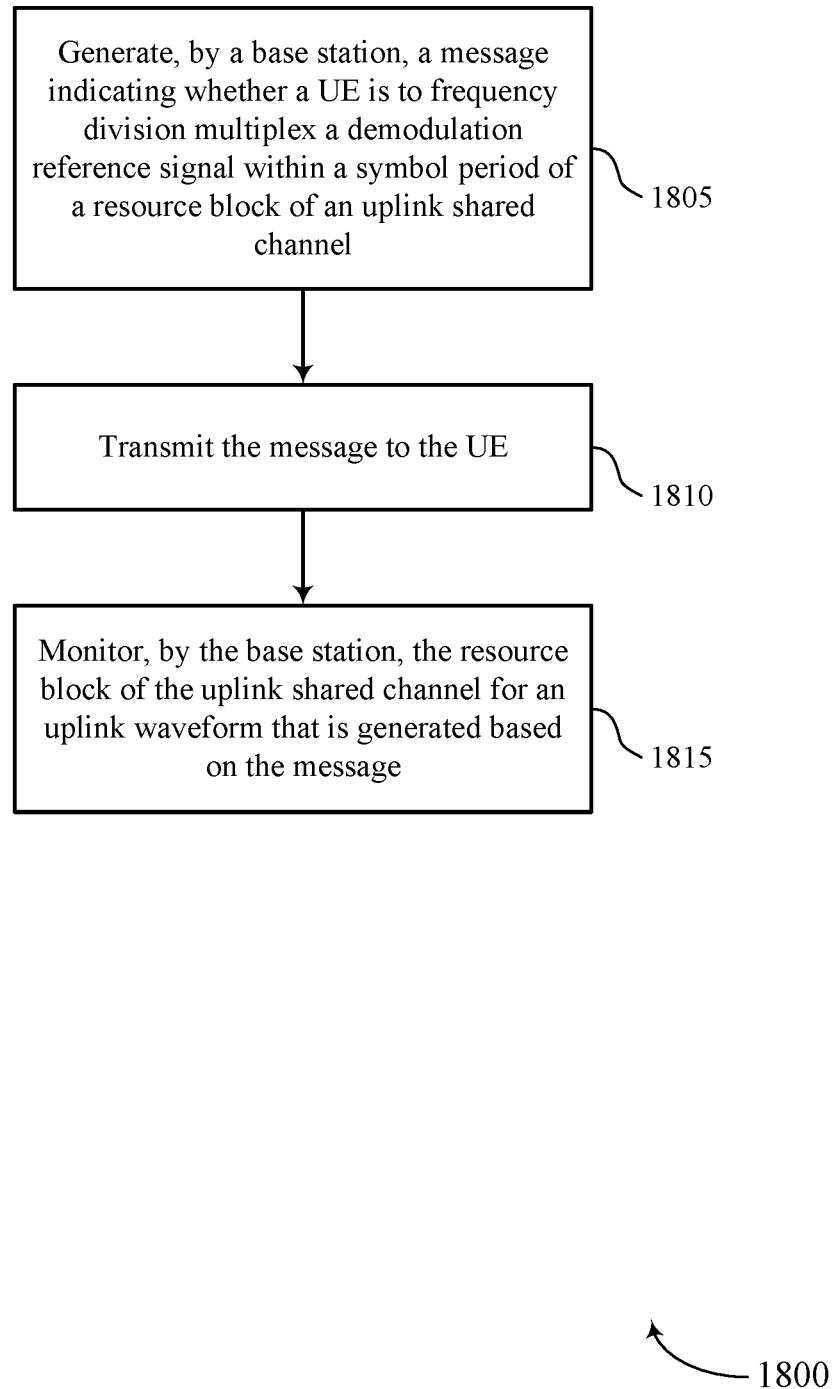

FIG. 18 shows a flowchart illustrating a method 1800 for controlling multiplexing of a reference signal on an uplink shared channel in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may generate, by a base station, a message indicating whether a user equipment (UE) is to frequency division multiplex a demodulation reference signal within a symbol period of a resource block of an uplink shared channel. The operations of 1805 may be performed according to the methods described herein. In some examples, aspects of the operations of 1805 may be performed by a message component as described with reference to FIGS. 12 through 15.

At 1810 the base station 105 may transmit the message to the UE. The operations of 1810 may be performed according to the methods described herein. In some examples, aspects of the operations of 1810 may be performed by a transmitter as described with reference to FIGS. 12 through 15.

At 1815 the base station 105 may monitor, by the base station, the resource block of the uplink shared channel for an uplink waveform that is generated based at least in part on the message. The operations of 1815 may be performed according to the methods described herein. In some examples, aspects of the operations of 1815 may be performed by a waveform component as described with reference to FIGS. 12 through 15.

Figure 19:
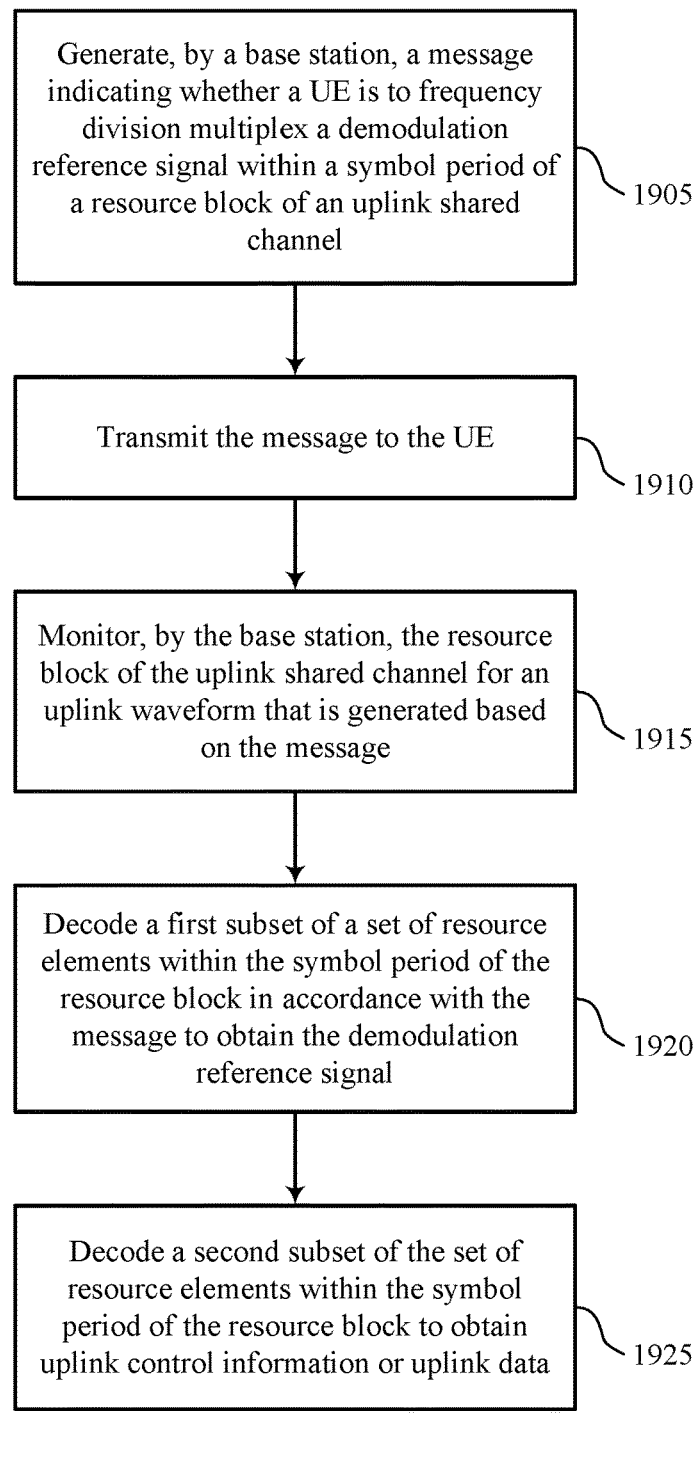

FIG. 19 shows a flowchart illustrating a method 1900 for controlling multiplexing of a reference signal on an uplink shared channel in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may generate, by a base station, a message indicating whether a user equipment (UE) is to frequency division multiplex a demodulation reference signal within a symbol period of a resource block of an uplink shared channel. The operations of 1905 may be performed according to the methods described herein. In some examples, aspects of the operations of 1905 may be performed by a message component as described with reference to FIGS. 12 through 15.

At 1910 the base station 105 may transmit the message to the UE. The operations of 1910 may be performed according to the methods described herein. In some examples, aspects of the operations of 1910 may be performed by a transmitter as described with reference to FIGS. 12 through 15.

At 1915 the base station 105 may monitor, by the base station, the resource block of the uplink shared channel for an uplink waveform that is generated based at least in part on the message. The operations of 1915 may be performed according to the methods described herein. In some examples, aspects of the operations of 1915 may be performed by a waveform component as described with reference to FIGS. 12 through 15.

At 1920 the base station 105 may decode a first subset of a plurality of resource elements within the symbol period of the resource block in accordance with the message to obtain the demodulation reference signal. The operations of 1920 may be performed according to the methods described herein. In some examples, aspects of the operations of 1920 may be performed by a decoder as described with reference to FIGS. 12 through 15.

At 1925 the base station 105 may decode a second subset of the plurality of resource elements within the symbol period of the resource block to obtain uplink control information or uplink data. The operations of 1925 may be performed according to the methods described herein. In some examples, aspects of the operations of 1925 may be performed by a decoder as described with reference to FIGS. 12 through 15.

Figure 20:
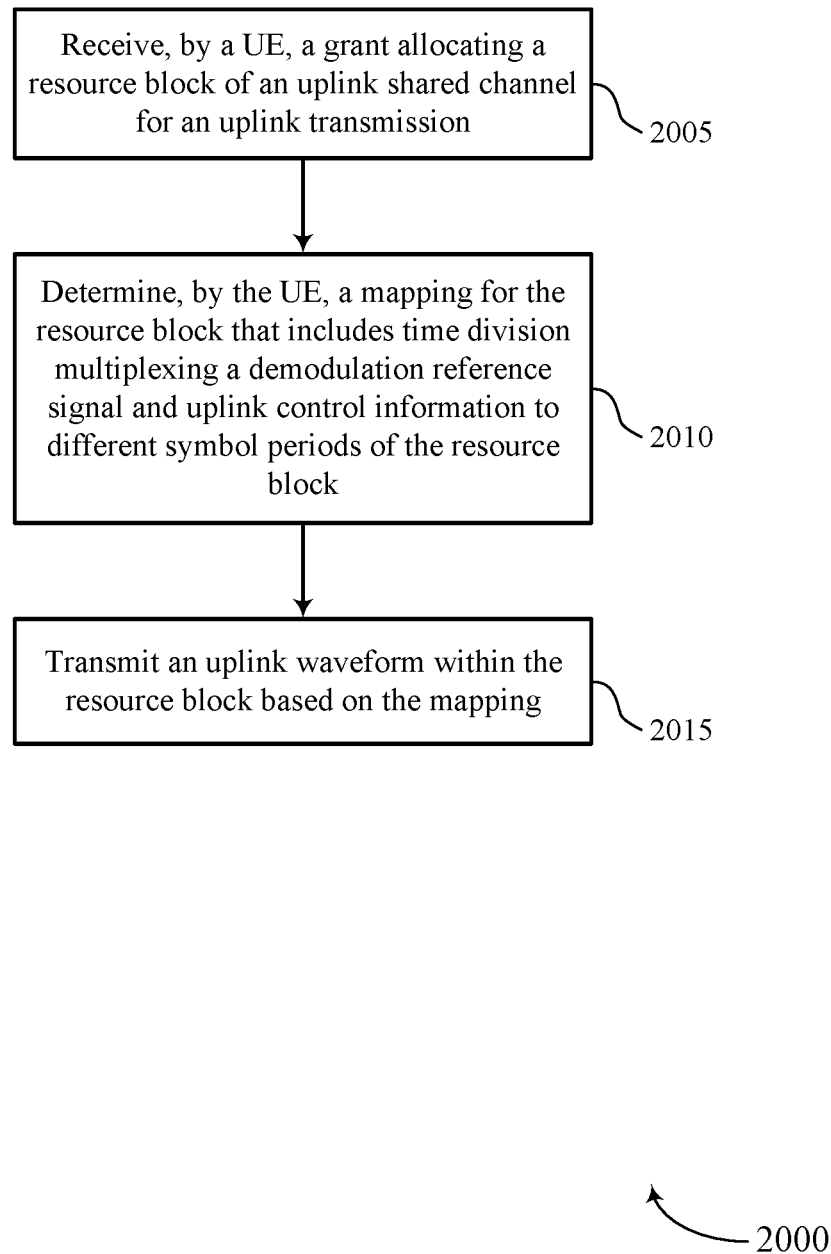

FIG. 20 shows a flowchart illustrating a method 2000 that supports controlling frequency division multiplexing of a reference signal on an uplink shared channel in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, by a UE, a grant allocating a resource block of an uplink shared channel for an uplink transmission. The operations of 2005 may be performed according to the methods described herein. In some examples, aspects of the operations of 2005 may be performed by an indication component as described with reference to FIGS. 8 through 11.

At 2010, the UE may determine, by the UE, a mapping for the resource block that includes time division multiplexing a demodulation reference signal and uplink control information to different symbol periods of the resource block. The operations of 2010 may be performed according to the methods described herein. In some examples, aspects of the operations of 2010 may be performed by a multiplexing component as described with reference to FIGS. 8 through 11.

At 2015, the UE may transmit an uplink waveform within the resource block based on the mapping. The operations of 2015 may be performed according to the methods described herein. In some examples, aspects of the operations of 2015 may be performed by a generating component as described with reference to FIGS. 8 through 11.

Figure 21:
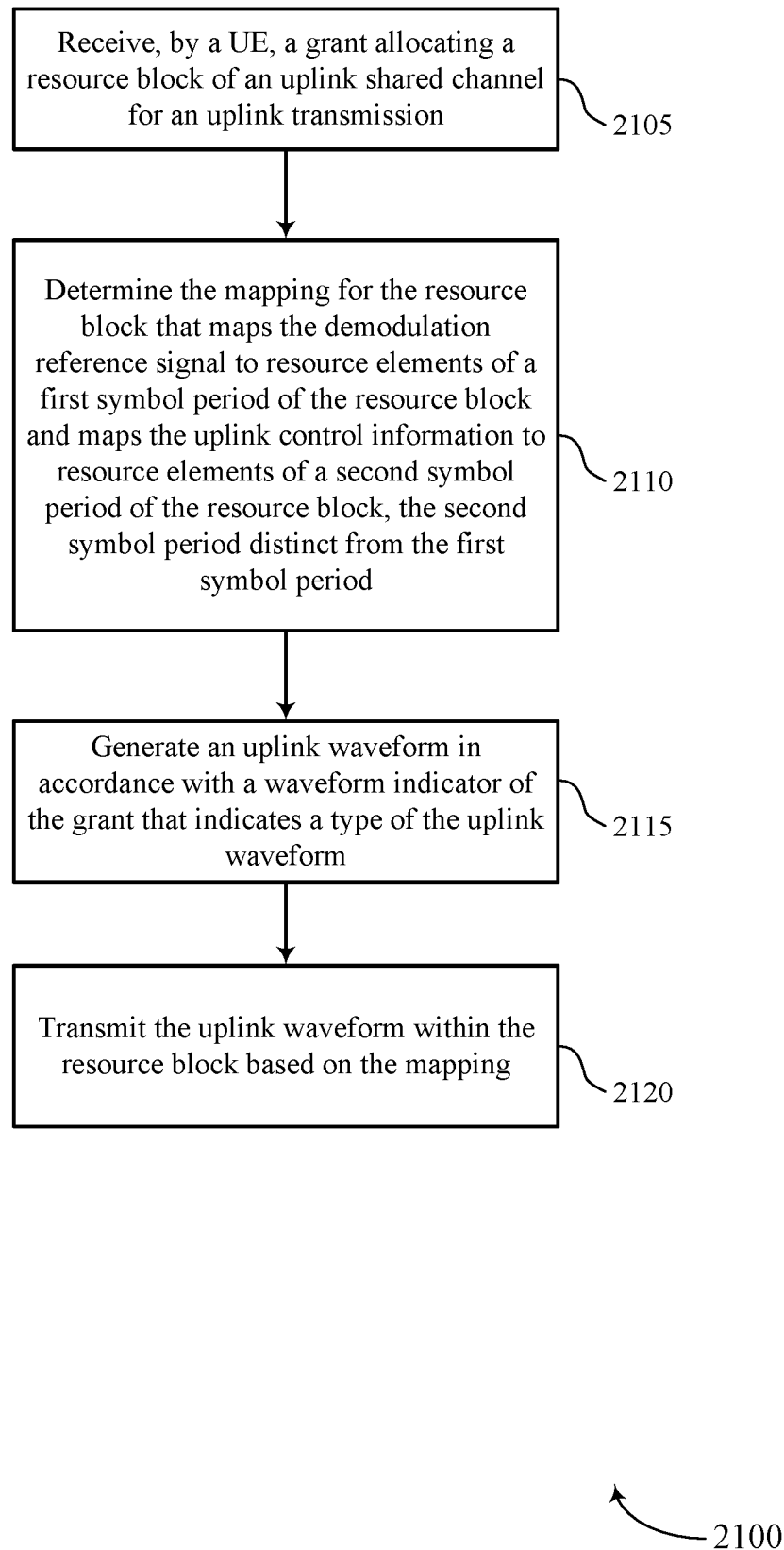

FIG. 21 shows a flowchart illustrating a method 2100 that supports controlling frequency division multiplexing of a reference signal on an uplink shared channel in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive, by a UE, a grant allocating a resource block of an uplink shared channel for an uplink transmission. The operations of 2105 may be performed according to the methods described herein. In some examples, aspects of the operations of 2105 may be performed by an indication component as described with reference to FIGS. 8 through 11.

At 2110, the UE may determine the mapping for the resource block that maps the demodulation reference signal to resource elements of a first symbol period of the resource block and maps the uplink control information to resource elements of a second symbol period of the resource block, the second symbol period distinct from the first symbol period. The operations of 2110 may be performed according to the methods described herein. In some examples, aspects of the operations of 2110 may be performed by a multiplexing component as described with reference to FIGS. 8 through 11.

At 2115, the UE may generate an uplink waveform in accordance with a waveform indicator of the grant that indicates a type of the uplink waveform. The operations of 2120 may be performed according to the methods described herein. In some examples, aspects of the operations of 2120 may be performed by a generating component as described with reference to FIGS. 8 through 11.

At 2120, the UE may transmit the uplink waveform within the resource block based on the mapping. The operations of 2115 may be performed according to the methods described herein. In some examples, aspects of the operations of 2115 may be performed by a generating component as described with reference to FIGS. 8 through 11.

It should be noted that the methods described above describe possible implementations, and that the operations and the steps may be rearranged or otherwise modified and that other implementations are possible. Additionally, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Additionally, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Additionally, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
   memory storing processor-executable code; and
   one or more processors coupled with the memory and operable to execute the code to cause the UE to:
      receive, by the UE, downlink control information comprising a grant allocating a resource block of an uplink shared channel for an uplink transmission and indicating whether to frequency division multiplex a demodulation reference signal with uplink shared data based at least in part on whether the uplink transmission comprises the uplink shared data;
      determine, by the UE, a mapping for the resource block of the uplink shared channel that includes the demodulation reference signal and uplink control information in the resource block of the uplink shared channel, wherein the demodulation reference signal is mapped to two symbols periods of the uplink shared channel and resource elements of the demodulation reference signal in each symbol period are separated by one or more intervening resource elements, and wherein, to determine the mapping, the one or more processors are further operable to execute the code to cause the UE to:
         time division multiplex the demodulation reference signal and the uplink control information to different symbol periods of the resource block of the uplink shared channel, wherein:
            the demodulation reference signal and the uplink shared data are frequency division multiplexed when the downlink control information indicates that the uplink transmission comprises the uplink shared data and the downlink control information indicates to frequency division multiplex the demodulation reference signal with the uplink shared data; or
            the one or more intervening resource elements are empty when the downlink control information indicates that the uplink transmission does not comprise the uplink shared data; and
      transmit the uplink transmission within the resource block of the uplink shared channel based at least in part on the mapping.

2. The UE of claim 1, wherein, to transmit the uplink transmission, the one or more processors are operable to execute the code to cause the UE to:
   transmit the demodulation reference signal on resource elements of a first symbol period of the resource block of the uplink shared channel and the uplink control information on resource elements of a second symbol period of the resource block of the uplink shared channel, the second symbol period distinct from the first symbol period.

3. The UE of claim 1, wherein the one or more processors are further operable to execute the code to cause the UE to:
   receive, by the UE, radio resource control signaling comprising a waveform indicator that indicates a type of an uplink waveform of the uplink transmission.

4. The UE of claim 1, wherein the uplink control information comprises a hybrid automatic repeat request acknowledgement indication.

5. The UE of claim 1, wherein the uplink control information comprises control state information part 1 data that includes at least one of a rank indicator, a channel state information reference signal index, or a channel quality indicator.

6. The UE of claim 1, wherein the uplink control information comprises control state information part 2 data that includes at least one of a precoding matrix indicator, or a channel quality indicator.

7. A method for wireless communication by a user equipment (UE), comprising:
   receiving, by the UE, downlink control information comprising a grant allocating a resource block of an uplink shared channel for an uplink transmission and indicating whether to frequency division multiplex a demodulation reference signal with uplink shared data based at least in part on whether the uplink transmission comprises the uplink shared data;
   determining, by the UE, a mapping for the resource block of the uplink shared channel that includes the demodulation reference signal and uplink control information in the resource block of the uplink shared channel, wherein the demodulation reference signal is mapped in two symbols periods of the uplink shared channel and resource elements of the demodulation reference signal in each symbol period are separated by one or more intervening resource elements, and wherein the determining the mapping comprises:
      time division multiplexing the demodulation reference signal and the uplink control information to different symbol periods of the resource block of the uplink shared channel, wherein:
         the demodulation reference signal and the uplink shared data are frequency division multiplexed when the downlink control information indicates that the uplink transmission comprises the uplink shared data and the downlink control information indicates to frequency division multiplex the demodulation reference signal with the uplink shared data; or
         the one or more intervening resource elements are empty when the downlink control information indicates that the uplink transmission does not comprise the uplink shared data; and
   transmitting the uplink transmission within the resource block of the uplink shared channel based at least in part on the mapping.

8. The method of claim 7, wherein transmitting the uplink transmission comprises:
   transmitting the demodulation reference signal on resource elements of a first symbol period of the resource block of the uplink shared channel and the uplink control information on resource elements of a second symbol period of the resource block of the uplink shared channel, the second symbol period distinct from the first symbol period.

9. The method of claim 7, further comprising:
receiving, by the UE, radio resource control signaling comprising a waveform indicator that indicates a type of an uplink waveform of the uplink transmission.

10. The method of claim 7, wherein the uplink control information comprises a hybrid automatic repeat request acknowledgement indication.

11. The method of claim 7, wherein the uplink control information comprises control state information part 1 data that includes at least one of a rank indicator, a channel state information reference signal index, or a channel quality indicator.

12. The method of claim 7, wherein the uplink control information comprises control state information part 2 data that includes at least one of a precoding matrix indicator, or a channel quality indicator.

13. A user equipment (UE) for wireless communication, comprising:
means for receiving, by the UE, downlink control information comprising a grant allocating a resource block of an uplink shared channel for an uplink transmission and indicating whether to frequency division multiplex a demodulation reference signal with uplink shared data based at least in part on whether the uplink transmission comprises the uplink shared data;
means for determining, by the UE, a mapping for the resource block of the uplink shared channel that includes the demodulation reference signal and uplink control information in the resource block of the uplink shared channel, wherein the demodulation reference signal is mapped in two symbols periods of the uplink shared channel and resource elements of the demodulation reference signal in each symbol period are separated by one or more intervening resource elements, and wherein the means for determining the mapping comprises:
means for time division multiplexing the demodulation reference signal and the uplink control information to different symbol periods of the resource block of the uplink shared channel, wherein:
the demodulation reference signal and the uplink shared data are frequency division multiplexed when the downlink control information indicates that the uplink transmission comprises the uplink shared data and the downlink control information indicates to frequency division multiplex the demodulation reference signal with the uplink shared data; or
the one or more intervening resource elements are empty when the downlink control information indicates that the uplink transmission does not comprise the uplink shared data; and
means for transmitting the uplink transmission within the resource block of the uplink shared channel based at least in part on the mapping.

14. The UE of claim 13, wherein the means for transmitting the uplink transmission comprise:
means for transmitting the demodulation reference signal on resource elements of a first symbol period of the resource block of the uplink shared channel and the uplink control information on resource elements of a second symbol period of the resource block of the uplink shared channel, the second symbol period distinct from the first symbol period.

15. The UE of claim 13, further comprising:
means for receiving, by the UE, radio resource control signaling comprising a waveform indicator that indicates a type of an uplink waveform of the uplink transmission.

16. The UE of claim 13, wherein the uplink control information comprises a hybrid automatic repeat request acknowledgement indication.

17. The UE of claim 13, wherein the uplink control information comprises control state information part 1 data that includes at least one of a rank indicator, a channel state information reference signal index, or a channel quality indicator.

18. A non-transitory computer-readable medium storing code for wireless communication, the code comprising instructions executable by one or more processors to:
receive, by a user equipment (UE), downlink control information comprising a grant allocating a resource block of an uplink shared channel for an uplink transmission and indicating whether to frequency division multiplex a demodulation reference signal with uplink shared data based at least in part on whether the uplink transmission comprises the uplink shared data;
determine, by the UE, a mapping for the resource block of the uplink shared channel that includes the demodulation reference signal and uplink control information in the resource block of the uplink shared channel, wherein the demodulation reference signal is mapped in two symbols periods of the uplink shared channel and resource elements of the demodulation reference signal in each symbol period are separated by one or more intervening resource elements, and wherein, to determine the mapping, the one or more processors are further operable to execute the code to:
time division multiplexing the demodulation reference signal and the uplink control information to different symbol periods of the resource block of the uplink shared channel, wherein:
the demodulation reference signal and the uplink shared data are frequency division multiplexed when the downlink control information indicates that the uplink transmission comprises the uplink shared data and the downlink control information indicates to frequency division multiplex the demodulation reference signal with the uplink shared data; or
the one or more intervening resource elements are empty when the downlink control information indicates that the uplink transmission does not comprise the uplink shared data; and
transmit the uplink transmission within the resource block of the uplink shared channel based at least in part on the mapping.

* * * * *